(12) United States Patent
Buehler et al.

(10) Patent No.: US 8,261,195 B2
(45) Date of Patent: Sep. 4, 2012

(54) METHOD FOR CUSTOMIZING COVER FOR ELECTRONIC DEVICE

(75) Inventors: Doyle Buehler, Winnipeg (CA); Ronald A. Burke, Toronto (CA)

(73) Assignee: Skinit, Inc., San Diego, CA (US)

( * ) Notice: Subject to any disclaimer, the term of this patent is extended or adjusted under 35 U.S.C. 154(b) by 1010 days.

(21) Appl. No.: 11/914,353

(22) PCT Filed: May 12, 2006

(86) PCT No.: PCT/CA2006/000758
§ 371 (c)(1),
(2), (4) Date: Jun. 20, 2008

(87) PCT Pub. No.: WO2006/119632
PCT Pub. Date: Nov. 16, 2006

(65) Prior Publication Data
US 2008/0313552 A1 Dec. 18, 2008

Related U.S. Application Data

(60) Provisional application No. 60/680,570, filed on May 13, 2005.

(51) Int. Cl.
*G06F 3/00* (2006.01)
(52) U.S. Cl. ........ 715/744; 715/964
(58) Field of Classification Search .......... 382/141–146, 382/209–211, 217; 715/744–747, 771, 705–712, 715/765, 864, 798–801, 772–773, 964, 970, 715/760, 762–763; 438/23–27
See application file for complete search history.

(56) References Cited

U.S. PATENT DOCUMENTS

| | | | |
|---|---|---|---|
| 6,407,821 B1 | 6/2002 | Hohensee et al. | |
| 6,788,824 B1 | 9/2004 | Prestia | |
| 7,016,865 B1 * | 3/2006 | Weber et al. | 705/26.5 |
| 7,216,092 B1 * | 5/2007 | Weber et al. | 705/26.5 |
| 7,373,610 B2 * | 5/2008 | Nakamura | 715/765 |
| 2001/0015730 A1 | 8/2001 | Felser et al. | |
| 2002/0057289 A1 * | 5/2002 | Crawford et al. | 345/744 |
| 2002/0069215 A1 | 6/2002 | Orbanes et al. | |
| 2002/0107737 A1 * | 8/2002 | Kaneko et al. | 705/14 |
| 2003/0041104 A1 | 2/2003 | Wingard et al. | |
| 2003/0182402 A1 * | 9/2003 | Goodman et al. | 709/220 |

(Continued)

FOREIGN PATENT DOCUMENTS
WO 0111491 A1 2/2001
(Continued)

OTHER PUBLICATIONS

International Search Report for International Application No. PCT/CA2006/000758 filed May 12, 2006 (3 pages).

(Continued)

*Primary Examiner* — Steven Sax
(74) *Attorney, Agent, or Firm* — Fitch, Even, Tabin & Flannery, LLP

(57) ABSTRACT

A method and system for customizing a cover for an electronic device is provided. A plurality of templates associated with a plurality of electronic devices are provided. A client may select a template. The client may create and edit images on the template associated with a model of an electronic device. The method including printing or manufacturing the customized cover using the template.

36 Claims, 33 Drawing Sheets

U.S. PATENT DOCUMENTS

| | | | |
|---|---|---|---|
| 2005/0227677 A1* | 10/2005 | Kallio | 455/414.3 |
| 2006/0048057 A1 | 3/2006 | Herberger et al. | |
| 2006/0059253 A1 | 3/2006 | Goodman et al. | |
| 2006/0242032 A1* | 10/2006 | Cook et al. | 705/27 |
| 2007/0127084 A1 | 6/2007 | Hayashi | |
| 2007/0156837 A1* | 7/2007 | Elgar et al. | 709/208 |
| 2007/0246526 A1* | 10/2007 | Elgar et al. | 235/380 |
| 2007/0268505 A1 | 11/2007 | Smith | |
| 2008/0018946 A1 | 1/2008 | Higuchi et al. | |
| 2008/0030798 A1 | 2/2008 | O'Neil | |

FOREIGN PATENT DOCUMENTS

| | | |
|---|---|---|
| WO | 0124072 A1 | 4/2001 |

OTHER PUBLICATIONS

International Preliminary Report on Patentablity dated Nov. 22, 2007 for International Application No. PCT/CA2006/000758 filed May 12, 2006 (10 pages).

* cited by examiner

TeGo Process Flowchart
CheckOut

| TEGO LOGO | Bob Green's Tego Homepage | | | | | Overview |
|---|---|---|---|---|---|---|
| | Create NEW Tego | Customer Profile | Billing & Shipping | Order History | My Tego | Contact |

Order Confirmation [Print]   Your order has been processed. Please print this page for your records and proof of purchase.

Billing Info:
Bob Green
99 Atlantic Ave.
Toronto, ON Canada
M6K2J8
bob@green.com
416-699-9595

Shipping Info:
Bob Green
99 Atlantic Ave.
Toronto, ON Canada
M6K2J8
bob@green.com
416-699-9595

Order # 1001

| Qty | Date | Name of designs | Price |
|---|---|---|---|
| 1 | 02/02/05 | My Design 1 | 5.00 |
| 2 | 02/02/05 | My design 4 | 10.00 |

Sub-Total 15.00
PST 0.16
GST 0.14
Shipping 2.00
Discounts -0.50
Grand Total (CAD) 17.00

Card type: VISA
Name: Bob Green
Card Number: 1234567891012
Expiry: 02/06   Security Code: 123

— 144

| TEGO | Creator | Date |
|---|---|---|
| checkout: Receipt | | |

Fig. 23

① SELECT DEVICE ② SELECT MODEL ③ STYLIZE

Choose the make and then select your device from the resulting list. If you don't see your device, email us and we'll let you know as soon as we add it to our site!

Select the make of your device: Nokia

Tego Custom Covers are available for the following devices, with more being added regularly:

Cellular phones of all makes and models

Camera phones of all makes and models

Game systems such as the Gameboy, Gameboy Advance, Gameboy Advance SP and the Nokia N-Gage Music Devices like the iPod Mini, iPod 1G, 2G, 3G, and 4G, and the RCA Lyra Electronic Organizers of many different makes and models 1100 

1200 

225 

2260 

3100 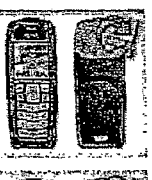

3120 

Close Window

CREATE NEW TEGO | ACCOUNT INFO | OVERVIEW | FEEDBACK

Order My Tego

Please enter your billing and shipping information below so that we can send you your Tego. Make sure all of your information is provided correctly below.

Billing Information
All the billing information fields below are required.

Name: [                    ]            Phone: [                    ]

Address:                                City: [                    ]
(# Street Name, Apt.)  [                    ]

Country: [-- Select --]                 Postal/Zip: [                    ]

Prov./State: [-- First choose country --]   Email: [                    ]

Shipping Information
You may simply check off the option below if the billing and shipping information is the same place.

☑ Shipping Information is the same as Billing Information

Name: [                    ]            Phone: [                    ]

Address: [                    ]         City: [                    ]

Country: [-- Select --]                 Postal/Zip: [                    ]

Prov./State: [-- First choose country --]   Email: [                    ]

How did you hear about us?
[                                        ]

[> PROCEED]

Fig. 32

METHOD FOR CUSTOMIZING COVER FOR ELECTRONIC DEVICE

CROSS REFERENCE TO RELATED APPLICATIONS

This application is entitled to the benefit of and incorporates by reference essential subject matter disclosed in International Patent Application No. PCT/CA2006/000758 filed on May 12, 2006 and U.S. Provisional Patent Application No. 60/680,570 filed May 13, 2005.

FIELD OF INVENTION

The present invention relates to graphic design applications, and more specifically to graphic design applications for customizing covers for devices.

BACKGROUND OF THE INVENTION

Online skin building tools are well known in the art. The skin building tools assist a user to create covers for devices, such as cellular phones. For example, there is an online application that allows a user to select a design on a cover based on an image the user has (e.g. Nokia, www.skinit.com). Further, there is an online application that allows a user to select a design as a sticker (www.signeetwork.com).

However, editing functionality is limited in these conventional tools. It is difficult to design covers for multiple electronic devices as the user wishes. Therefore it is desirable to provide system or method that can fully support a user to customize covers for multiple electronic devices.

SUMMARY OF THE INVENTION

The present invention relates to a system or method of customizing a cover for a device.

It is an object of the present invention to provide an improved method of customizing a cover for an electronic device.

In accordance with an aspect of a present invention, there is provided a method of customizing a cover for a device, which includes the steps of: at a server, providing a web-based customization tool to client through a network; at the client, implementing the customization tool including: selecting a device among a plurality of devices; displaying a template associated with the selected device; creating an image on the template to produce a customized template.

In accordance with a further aspect of the present invention, there is provided a method of customizing a cover for a device, which includes the steps of: preparing a plurality of templates for a plurality of devices; providing one of the templates in response to a request from a client; providing an editing tool to the client to allow the client to create image on the selected template.

In accordance with a further aspect of the present invention, there is provided a method of customizing a cover for a device, which includes the steps of: at a client, selecting a device among a plurality of devices, a template associated with the selected device being displayed on the client; at the client, creating an image on the template to produce a customized template.

The method or system according to the present invention may be implemented by any hardware, software or a combination of hardware and software having the above described functions. The software code, either in its entirety or a part thereof, may be stored in a computer readable medium. Further, a computer data signal representing the software code which may be embedded in a carrier wave may be transmitted via a communication network.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 15 is a diagram showing one example of a customer profile web page utilized in the process of FIG. 12;

FIG. 16 is a diagram showing one example of an edit information web page utilized in the process of FIG. 12;

FIG. 19 is a diagram showing one example of a billing/shipping information web page utilized in the process of FIG. 12;

FIG. 21 is a diagram showing one example of an order summary/payment method web page utilized in the process of FIG. 20;

FIG. 22 is a diagram showing one example of a credit card information view utilized in the process of FIG. 20;

FIG. 23 is a diagram showing one example of a payment confirmation view utilized in the process of FIG. 20;

FIG. 27 is a diagram showing additional example of a select device model web page associated with FIG. 24;

FIG. 32 is a diagram showing additional example of an order/profile web page associated with FIG. 24.

DETAILED DESCRIPTION

Figure 1:
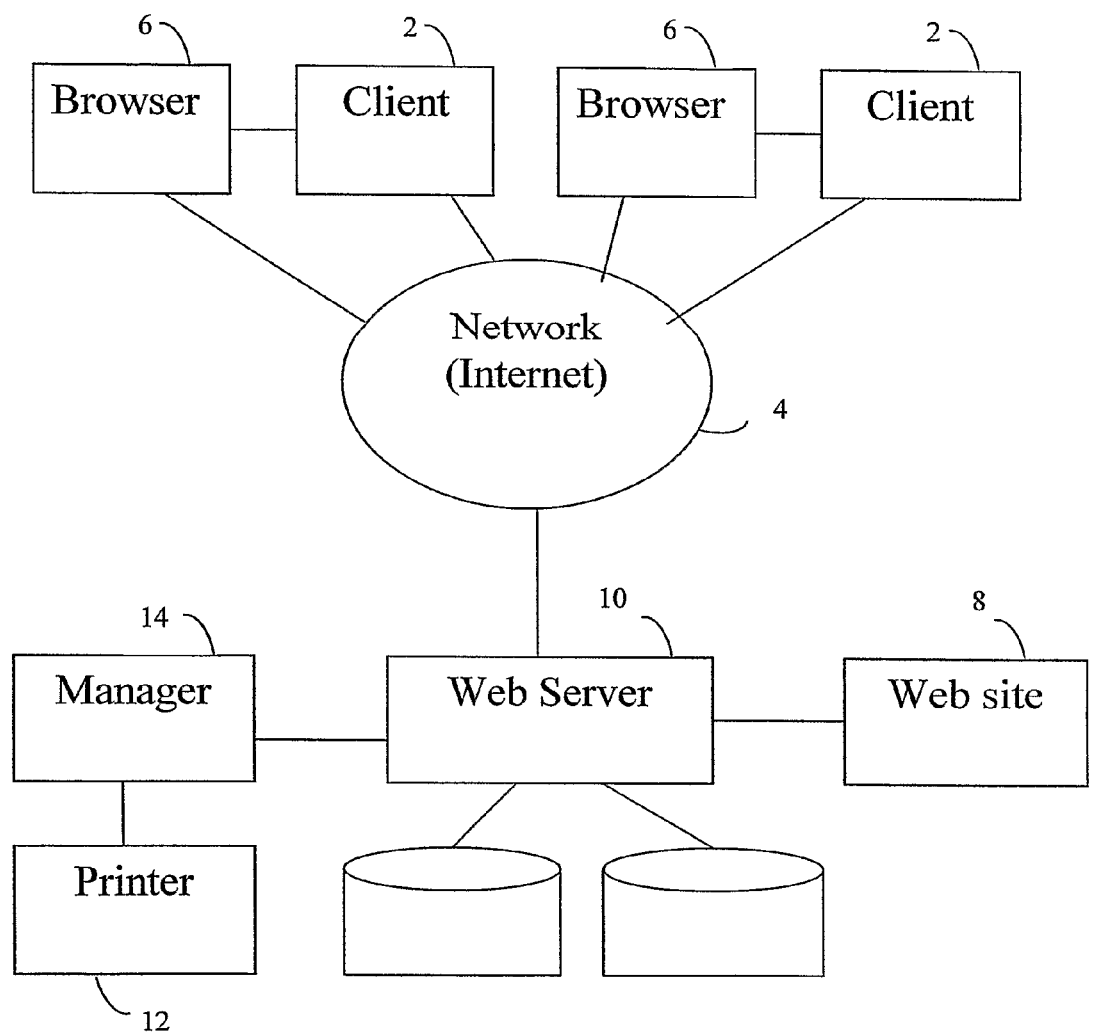
FIG. 1 is a diagram showing a system to which a cover customizer in accordance with an embodiment of the present invention is suitably applied.

The present invention will be illustrated in the following examples.

A cover may be applied to a device for protective or aesthetic reasons. A cover as described herein may be useful for protecting electronic devices such as cell phones, or may be useful for example in aiding in company phone identification, phone re-branding, enterprise advertising and promotion, and special events marketing. There is a need to provide customers, clients, or users with a method for customizing or personalizing a cover. The terms "customer", "client", and "user" may be used interchangeably.

A cover may be customized for any type of electronic device including, without limitation, computer notebooks, pagers, mobile phones, iPod and other MP3 players, XM Radio, PS2, PSP, XBox, Blackberry, or frequency scanners. In one example, a customization tool allows a client to customize a cover for an electronic device. The customization tool may provide or have access to a database or library for various electronic devices. For example, a cell phone database comprising cell phone manufacturers, such as Nokia, Ericsson, or Motorola, may be provided. In another example, a database of cell phone models produced by a cell phone manufacturer may be provided. Databases may be represented in any convenient form, for example, without limitation, pull-down menu, table format, or thumbnail or image. In yet another example, the customization tool may include a search function for searching the database. In one example, the customization tool may be implemented under web-based environment. In another example, the customization tool may be used in a local environment. In still another example, the customization tool may be located "locally" through retail type operating store locations where for example, store employees may operate to fill a request from the customers. In a further example, the customization tool is located locally, stand-alone, unmanned kiosks—where the customer would have walk up access.

In an example, there is provided a method of customizing a cover for a device, comprising:

preparing a plurality of templates for a plurality of devices;

providing one of the templates in response to a request from a client;

providing an editing tool to the client to allow the client to create image on the selected template.

A cover may be customized or personalized by including thereon one or more colors, text, names, company brands, slogans, images, patterns, designs, graphics, photographs, logos, advertisements, or any combination thereof. In one example, these images, designs, graphics colors or the like may for be provided or uploaded by a customer or they may be selected from a library provided in a web-based customization tool.

A cover may be made of any suitable material as is known in the art, for example, vinyl, plastic, silicone, rubber, acrylic, or a combination thereof. A cover may comprise dimensions such that it is capable of covering a single side or surface of the electronic device, or a portion of a single side or surface of an electronic device, for example, such as the surface of a cell phone having a display screen. Alternatively, a cover may comprise dimensions such that it may be wrapped around one or more sides of the electronic device, or portions of one or more sides of the electronic device. A cover may comprise a material that is transparent or substantially transparent, or comprise one or more parts which are transparent or substantially transparent. A cover may comprise "punch-out" sections or openings. In each case a template that corresponds to a desired cover type may be provided to a client.

A template of a surface of an electronic device can be provided to a client and the client can then create an image on the template. The client may add multiple images on a template. A template is a physical representation of an electronic device or a surface of an electronic device. Accordingly, a template may be any shape, pattern, design or any other physical configuration in a two-dimensional or three-dimensional representation.

Templates of an electronic device may be obtained by any convenient method, for example, from photographs and/or scans. Alternatively, dimensions and characteristics of the phones may be obtained from the phones/devices themselves, "dummies" of the phones/devices, a manufacturer, supplier or other organization. Commercial software, for example, but not limited to vector tracing programs may be employed to aid in this process of tracing contour lines for the cover. Generally, the templates create a trace line that may be used by the computer, printer, cutter or a combination thereof, as a contour line to maintain a clean cut, and to print "between the lines".

In one example, a user is provided with the ability to create an image on a template associated with a selected electronic device in order to produce a customized template. A client can select an image by any convenient method, for example, uploading an image to a web-based customization tool, or for example selecting an image from a library that can be accessed through the web-based customization tool. One or more than one image may be selected for use with a template. Once an image is selected it may be manipulated, edited or modified in any manner that would be known in the art of graphic design software, for example Corel Draw or Adobe Illustrator. For example, methods of image manipulation that may be used, include without limitation, image sliding or image dragging, image rotation, image cropping, image coloring, image blurring, changing image contrast, changing image brightness, image resizing while keeping a constant aspect ratio of height to width, image resizing while modifying aspect ratio, removing or replacing an object in an image, adding text, adding any number and/or form of shapes or lines, adding other images. In other examples, where multiple images have been selected each image may be independently manipulated. In still other examples, multiple images may be combined or overlaid. Furthermore, multiple templates corresponding to multiple surfaces of an electronic device can be provided and each template may be independently customized.

In one non-limiting example, a template may define sections that a transparent or substantially transparent part of a cover, or "punch-out" sections or openings of a cover, for example a cover that is placed on a cell phone surface having a display screen. In creating an image on such templates, a client may select one or more further image(s) to be created as a wallpaper or screensaver in a display screen.

A customized template produced by a client may be saved. The customized template image may then be used to produce a cover. In one example, the client using a web-based customization tool may save a customized template and upload it to the server. In another example, the customized template may be directly sent to a printer without saving it. Any suitable method of transferring or printing images to a substrate may be used in the production of a cover. For example, without limitation, a thermal printing process using resin based film, ribbon or foils may be employed. In another example, a cover may also be produced using a solvent based vinyl printing process utilizing liquid inks. A suitable printer may print graphics and subsequently, the necessary portions may be cut out by a punch, die-cutting machine, contour cutter, for example, but not limited to a CNC cutter, linear cutting blade, or the like. Alternatively, a thermal/solvent printer may be employed followed by a specialized machine to cut a cover to an appropriate size. Other methods may also be employed as would be evident to someone of skill in the art, and such methods may be used with the method or system for customizing a cover.

Method or system for customizing a cover may be implemented by any hardware, software or a combination of hardware and software. The software code, either in its entirety or a part thereof, may be stored in a computer readable medium. Further, a computer data signal representing the software code which may be embedded in a carrier wave may be transmitted via a communication network.

In one non-limiting example, software related to the cover cutomizer is used on the website-based environment. However, the software may be easily used in a local environment, such as retail. For example, the software may be located "locally" either through retail type operating store locations, or stand-alone, unmanned kiosks—where the customer would have walk up access.

FIG. 1 is a diagram showing a system to which an online cover customizer in accordance with an embodiment of the present invention is suitably applied.

Users 2 access a network (e.g. Internet 4) via web browsers 6 (or similar interactive communication software) running on computers or other devices that are accessible to the Internet 4. Software for the cover customizer is downloaded from a web server 10, and is run on the user browser 6.

The online cover customizer is implemented through a website 8. The user is capable of accessing the website 8 through the web server 10. The website 8 provides web pages, which allow the user to customize a cover for a device. Preferably, the user will customize a cover for an electronic device.

The electronic device may include any kind of electronic devices, for example, but not limited to electronic communication devices, such as, handheld devices including cellular phones, personal digital assistants (PDAs), pagers, radios, two-way radios, CBs, palm-pilots, cameras, MP3 players, music video and audio devices, including but not limited to portable music, video and audio devices, electronic organizers, remote controls for electronic devices, and the like. Other electronic devices, for example, but not limited to electronic gaming systems, computers, laptops, cash registers, monitor frames, parking meters are also meant to be included within the scope of the meaning of the term "electronic device".

The cover may include a pressure sensitive adhesive, for example, but not limited to a vinyl pressure sensitive adhesive, a silicone pressure sensitive adhesive, an acrylic pressure sensitive adhesive, a rubber pressure sensitive adhesive or combinations thereof. The cover will wrap at least one surface of the electronic device by the pressure sensitive adhesive. The pressure sensitive adhesive may be removable or substantially non-removable.

The online cover customizer allows the user to create an image printed on the covers, and to edit the image. The user is also capable of uploading and editing images. The image includes picture image, text image, any graphical image including shape, lines, or combinations thereof.

The online cover customizer allows the user to see how his electronic device will look with the cover on it. The user submits an order for the created image online by clicking a button for order. The order will be sent to the server 10. In response to the user's order, the image created by the user is printed on a sheet, for example, vinyl sheet. The cover is cut out from the sheet.

In FIG. 1, a printer/cutter 12 is shown. A printer may be a separate apparatus than a cutter, or a printer and cutter may be housed in a single apparatus. The printer/cutter 12 may include a printer for printing the ordered image on the sheet, and a cutter for cutting the sheet to form the cover. The printer/cutter 12 may include a device that can perform printing and cutting at the same time (for example, but not limited to a Roland PC 12).

The detail of manufacturing a cover is disclosed in U.S. patent application Ser. No. 10/993,310 filed on Nov. 19, 2004, entitled "Protective Cover For Electronic Device", which is hereby incorporated by reference in its entirety.

An administration manager 14 provides a means for managing orders real time, updating frequently changed content within the design customizer, and will be optimized based on current workflow to fulfill website orders.

The administration manager 14 includes an order management system for updating order status real-time, batch orders to a printer (12), and view simple reports on sales, a customer management system for viewing and editing customer profile details, and may include a coupon management system.

The server 10 and the manager 14 may communicate with one or more databases for managing data/information for the cover customizer.

The server 10 receives an order online. The manager 14 checks whether the order is correctly submitted, and prepare manufacturing of a cover with the ordered image. However, the web server 10 may check the order and send the order directly to the printer.

The cover customizer is now described in detail. The cover customizer provides a plurality of functionalities, such as device model selection, stylizing, and login.

Figure 2:
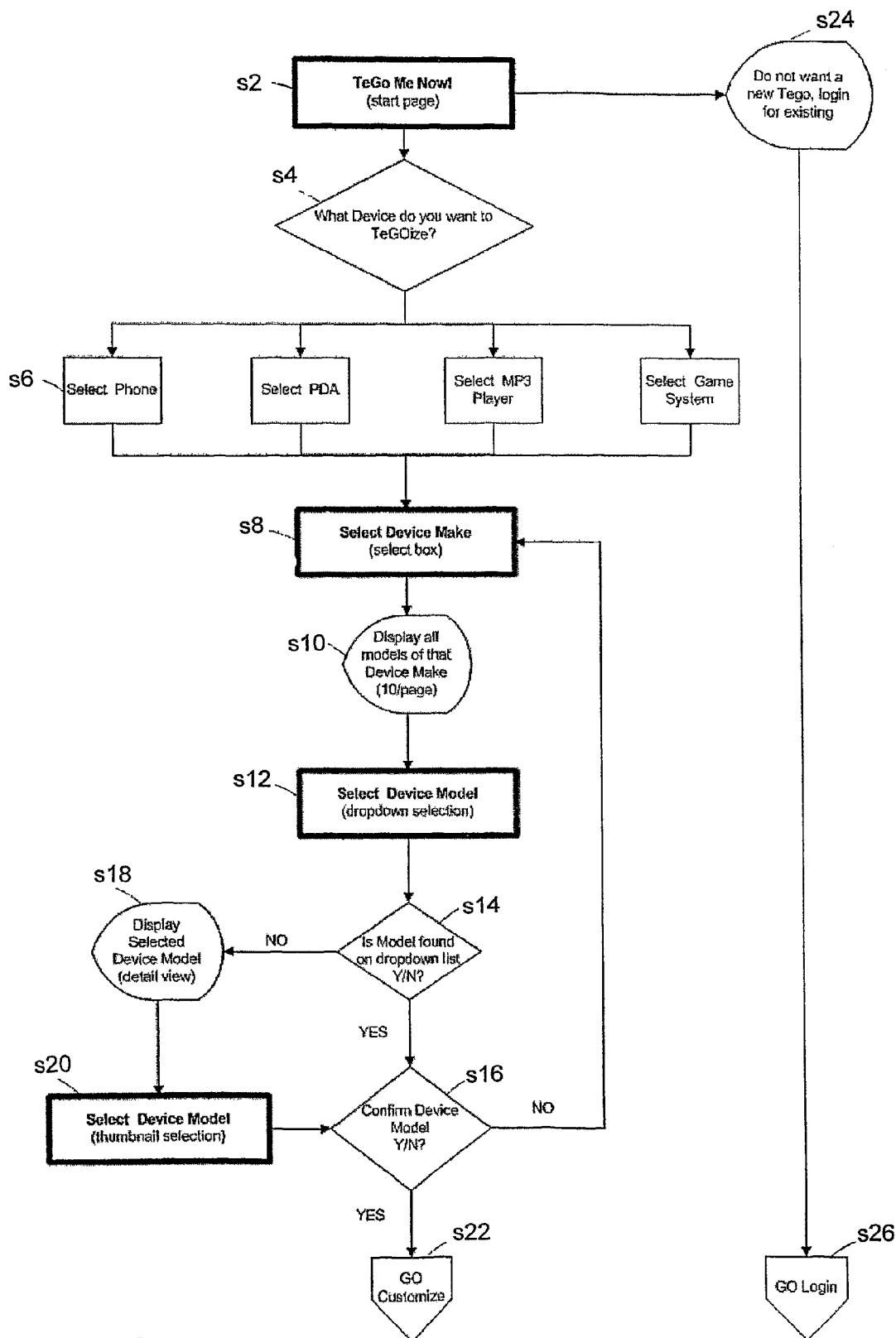
FIG. 2 is a flow chart showing an exemplary process for device model selection.

FIG. 2 is a flow chart showing an exemplary process for the device model selection. The device model selection navigates the user to select a device model which the user wishes to customize. Each box of FIG. 2 represents the user's experience in selecting the device model.

A start page (e.g. 100 of FIG. 3) is displayed on the user's screen (s2). The user determines which electronic device is to be customized (s4). The user may select one of devices from, for example, Phone, PDA, MP3, Gaming System, and the like (s6).

A "select device make" web page is displayed on the user's screen (s8). A selection box (e.g. dropdown window, table, thumbnail) for selecting a manufacturer is provided to the user. The user is prompted to select a manufacturer of the electronic device. Once the manufacturer is selected, all models provided by the selected manufacturer are displayed on the user's screen (s10).

A "select device model" web page is displayed on the user's screen (s12). A selection box (e.g. dropdown window, table, thumbnail) for selecting a device model is provided to the user. The user is prompted to select a specific model.

The user determines whether a specific model is within the list (s14). If yes, the user determines whether to confirm the selected model (s16). If the user wishes to make a change, the user goes to step s8. Upon the confirmation, a customize (stylizing) page starts (s22).

If there is no model on the web page, the detail view of the selected device model is provided (s18). The "select device model" web page with thumbnails is provided to the user (s20). The user selects a specific model by clicking on a thumbnail (s20), and goes to step s16.

At step 18, if there is no model on the web page, a pop up window for change request may be provided on the user's screen. Through the pop up window, the users are allowed to request to the server devices/models which the users wishes to have added to the web page and to provide an email address to contact them when the server receives it. Then the user goes to step s16.

At the start page, the user may select a login button (s24). Then, the start page moves to a login page (s26).

Figure 3:
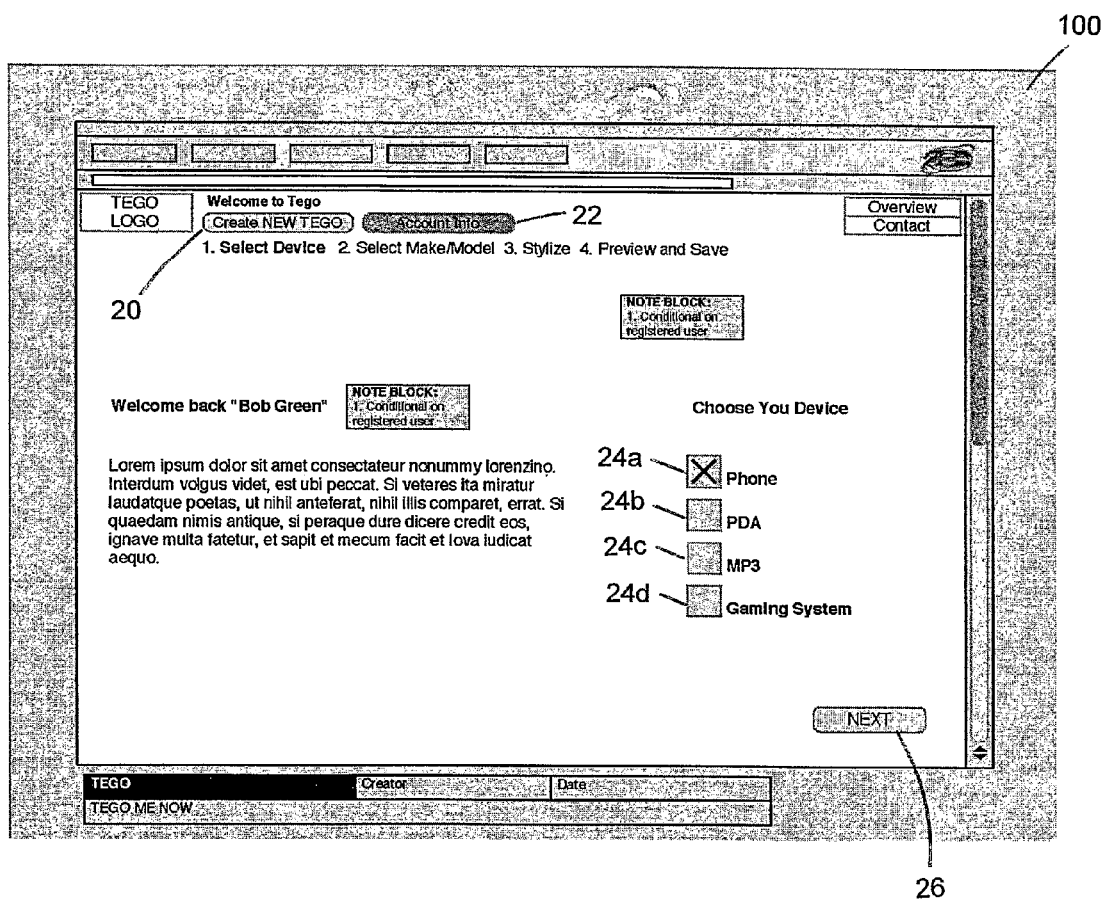
FIG. 3 is a diagram showing one example of a start page utilized in the process of FIG. 2.
Figure 4:
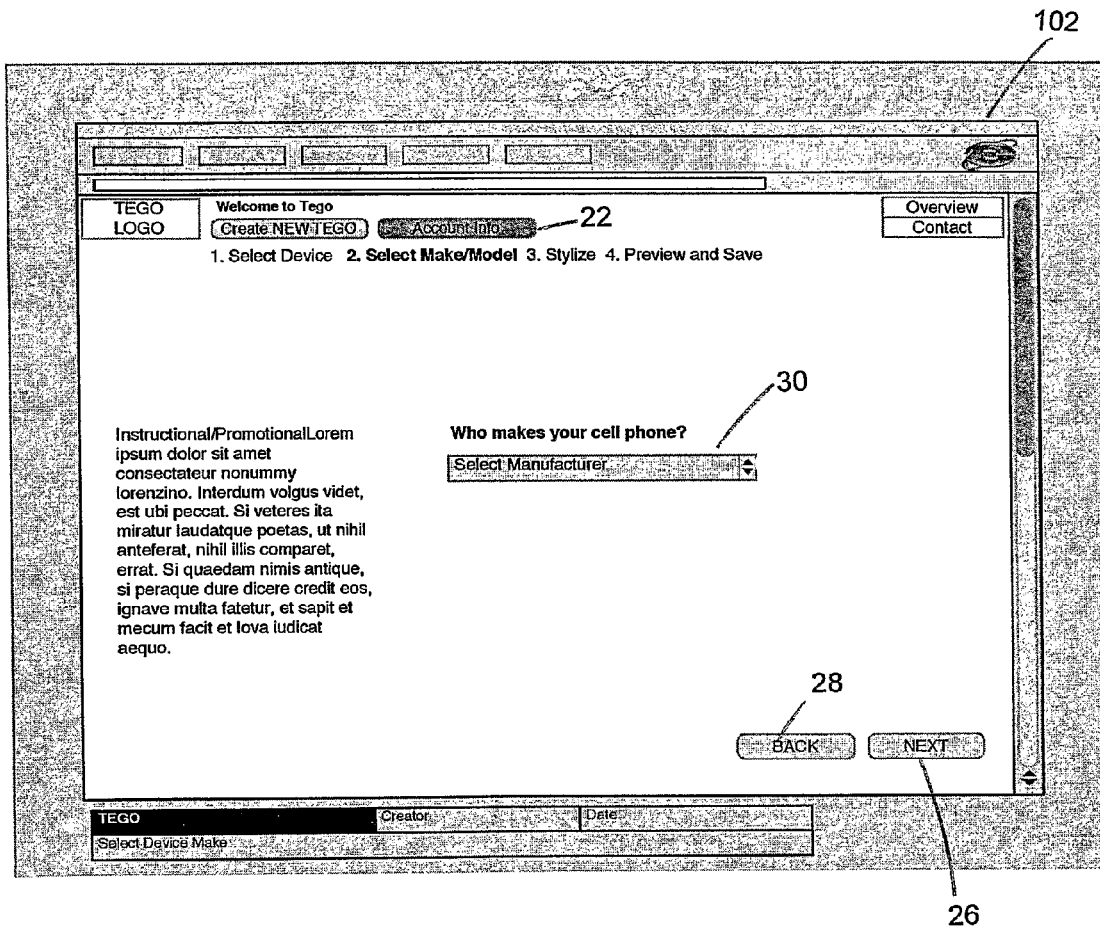
FIG. 4 is a diagram showing one example of a "select device make" web page utilized in the process of FIG. 2.
Figure 5:
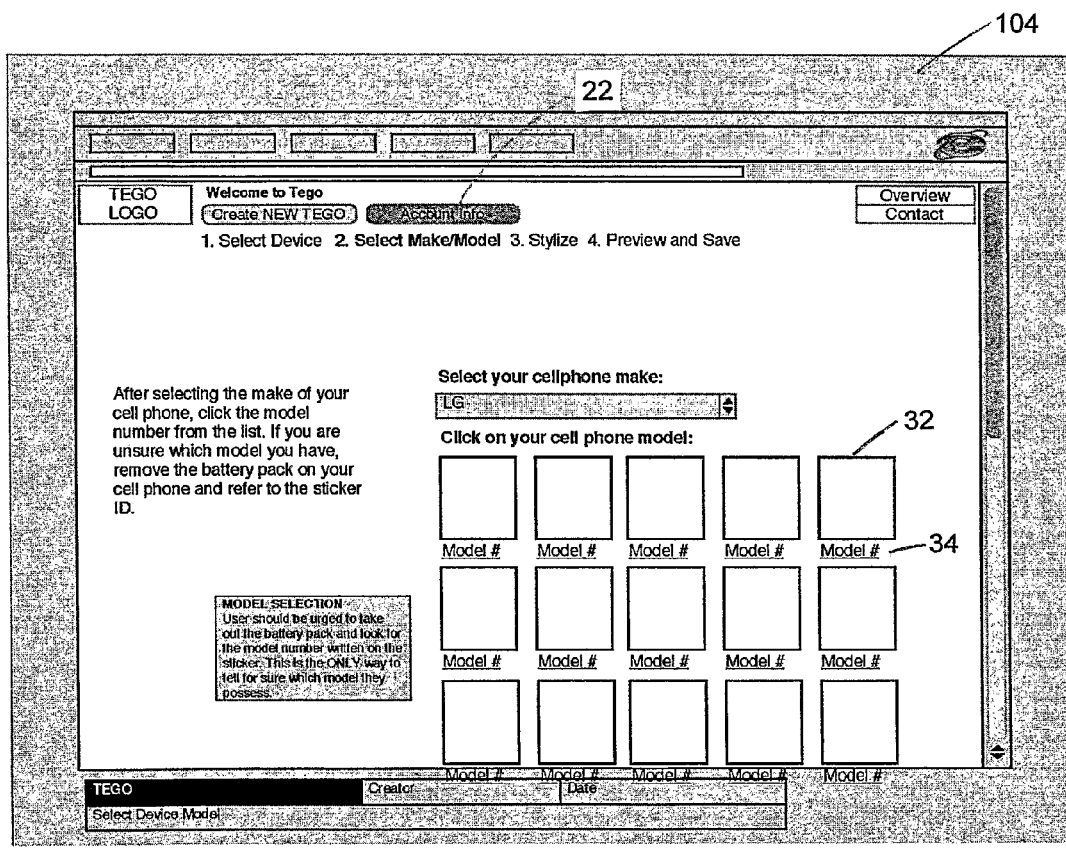
FIG. 5 is a diagram showing one example of a "select device model" web page utilized in the process of FIG. 2.

FIGS. 3-5 are diagrams showing exemplary web pages for the device model selection of FIG. 2. In particular, FIG. 3 shows one example of a start page 100; FIG. 4 shows one example of a "select device make" web page 102; FIG. 5 shows one exemplary view 104 of a "select device model" web page 104 with thumbnails.

Referring to FIGS. 3-5, the page 100 is an introductory page to the website. Once the user selects a button 20 of "Create New TEGO", the user is prompted to select one of electronic devices, such as phone 24a, PDA 24b, MP3 24c, Gaming System 24d. It is assumed that the user has selected the (cellular) phone 24a. The user may directly select one of the buttons 24a-24d without clicking the button 20.

Once an electronic device is selected, the web page 102 is displayed on the user's screen. At the page 102, the user is prompted to select a manufacturer through a "Select Manufacturer" box 30. This box 30 enables the user to select a manufacturer of the selected electronic device. The box 30 provides a dropdown selection list. The manufacturer list provided by the box 30 varies, depending on the electronic device selected at the page 100.

Once a manufacture is selected, models provided by the selected manufacturer are displayed as shown in the web page 104. For example, the models of the cellular phone, which are provided by the selected manufacturer, such as Nokia, are displayed with thumbnails 32 depicting each phone. Additionally, the model identifications (e.g. numbers) 34 are listed below for clarification. The user selects one model by clicking a thumbnail or a model identification. The detail of each model may be displayed by clicking a thumbnail or a model identification.

The web pages 100-104 may have an account information box 22 to allow the user to login his account information page. The web pages 100-102 may have a button 26 for allowing the user to look at a next page. The web pages 102-104 may have a button 28 for allowing the user to look at a previous page.

Figure 6:
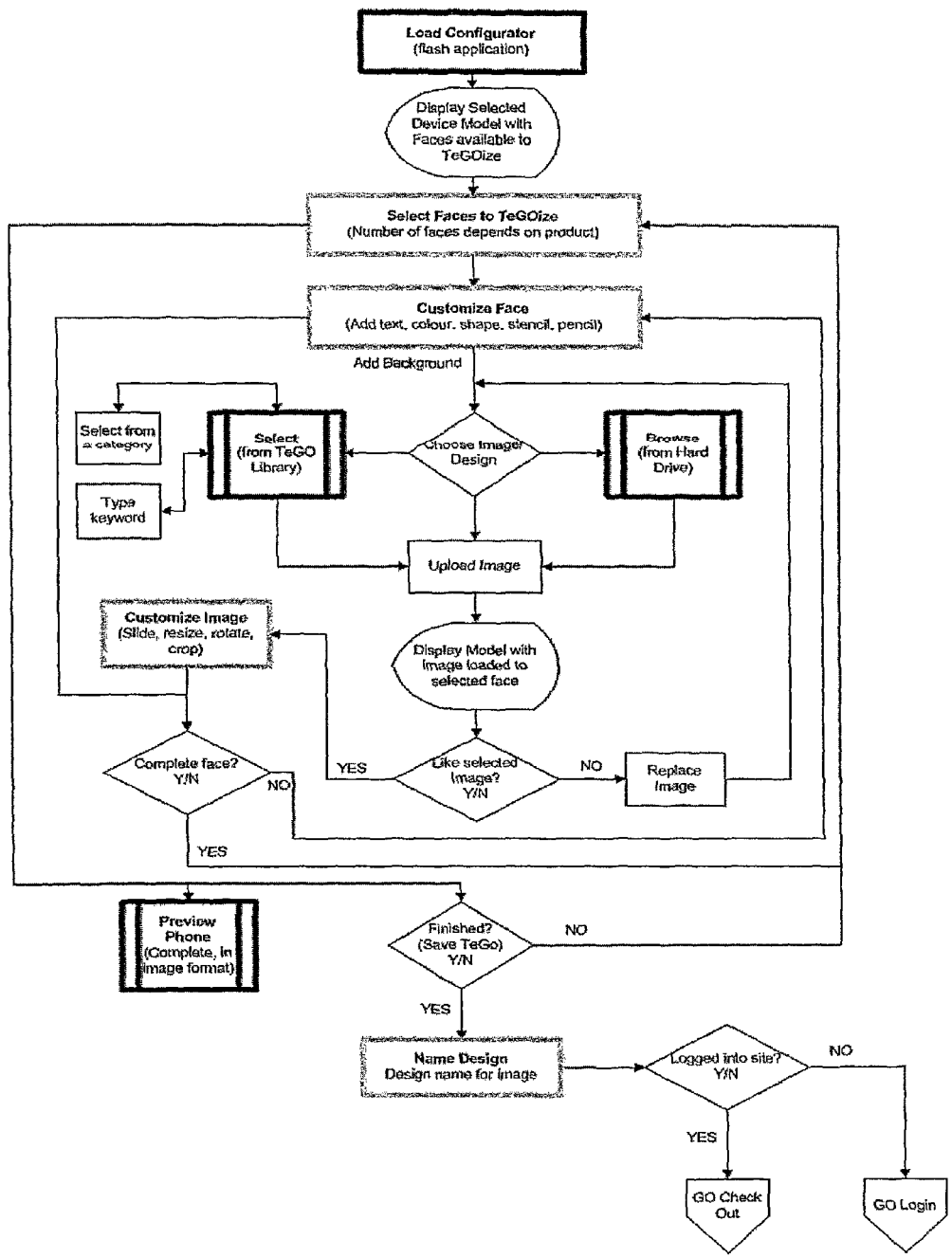
FIG. 6 is a flow chart showing an exemplary process for stylizing.

FIG. 6 is a flow chart showing an exemplary process for stylizing. Once the device model selection is completed, the stylizing process starts. The website provides a load configurator web page, a customize surface web page, a select from library window, a select from hard drive window, a preview web page. Through the web pages a user creates an image that is to be printed on a cover.

Figure 7:
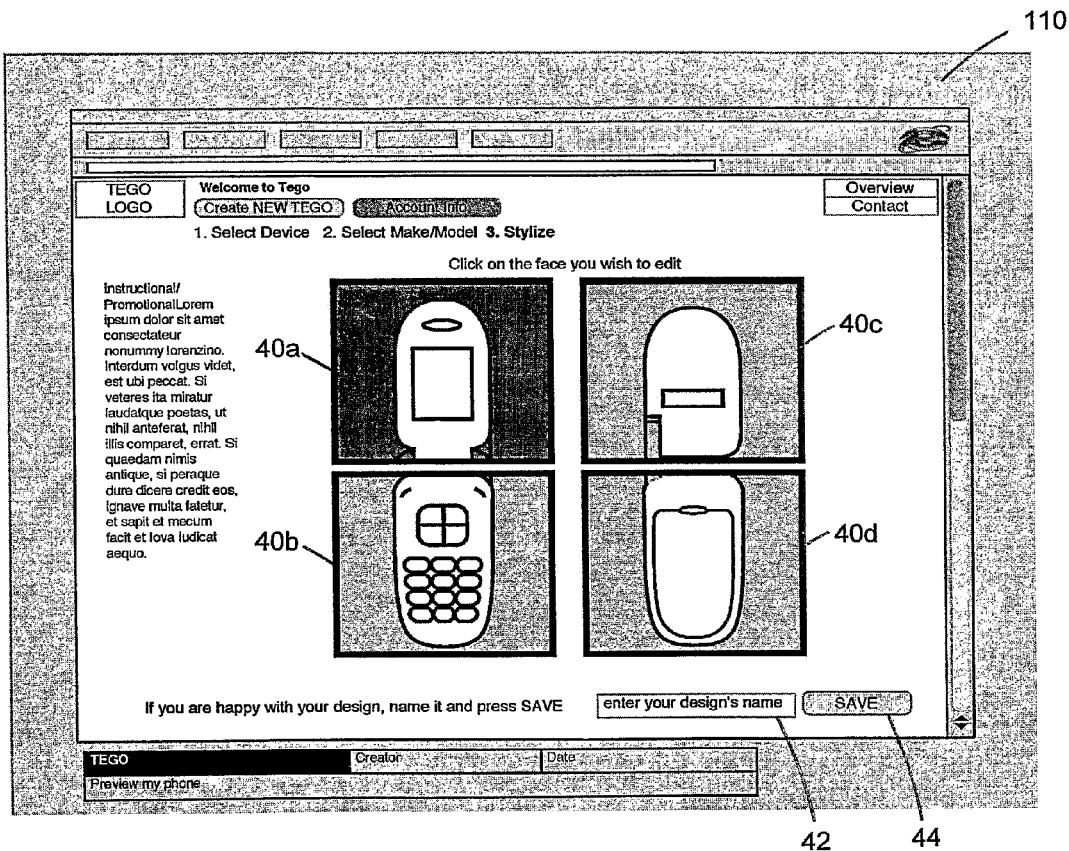
FIG. 7 is a diagram showing one example of a load congifurator web page utilized in the process of FIG. 6.
Figure 8:
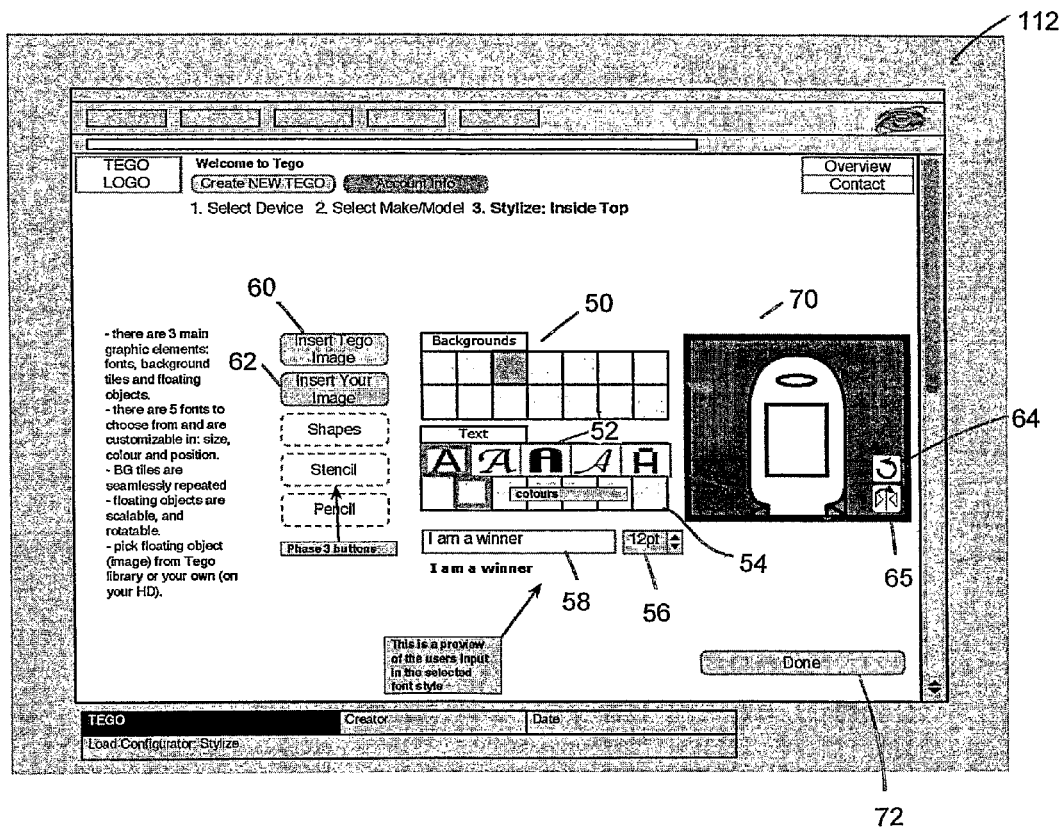
FIG. 8 is a diagram showing one example of a customize surface web page utilized in the process of FIG. 6.
Figure 9:
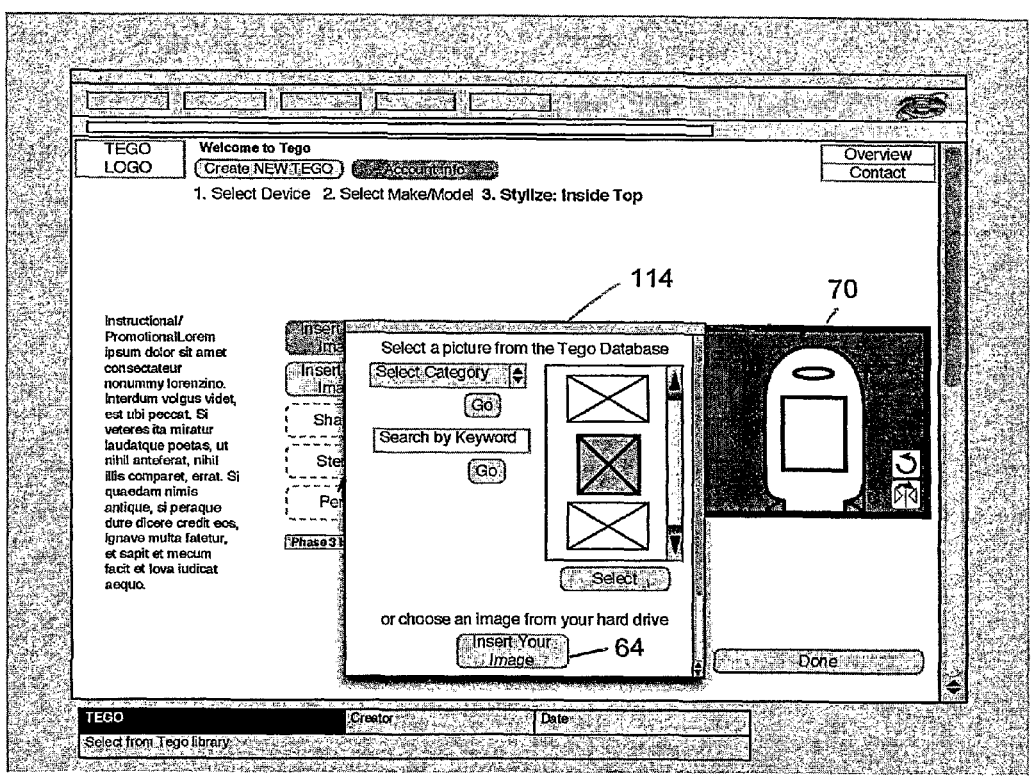
FIG. 9 is a diagram showing one example of a select from library window utilized in the process of FIG. 6.
Figure 10:
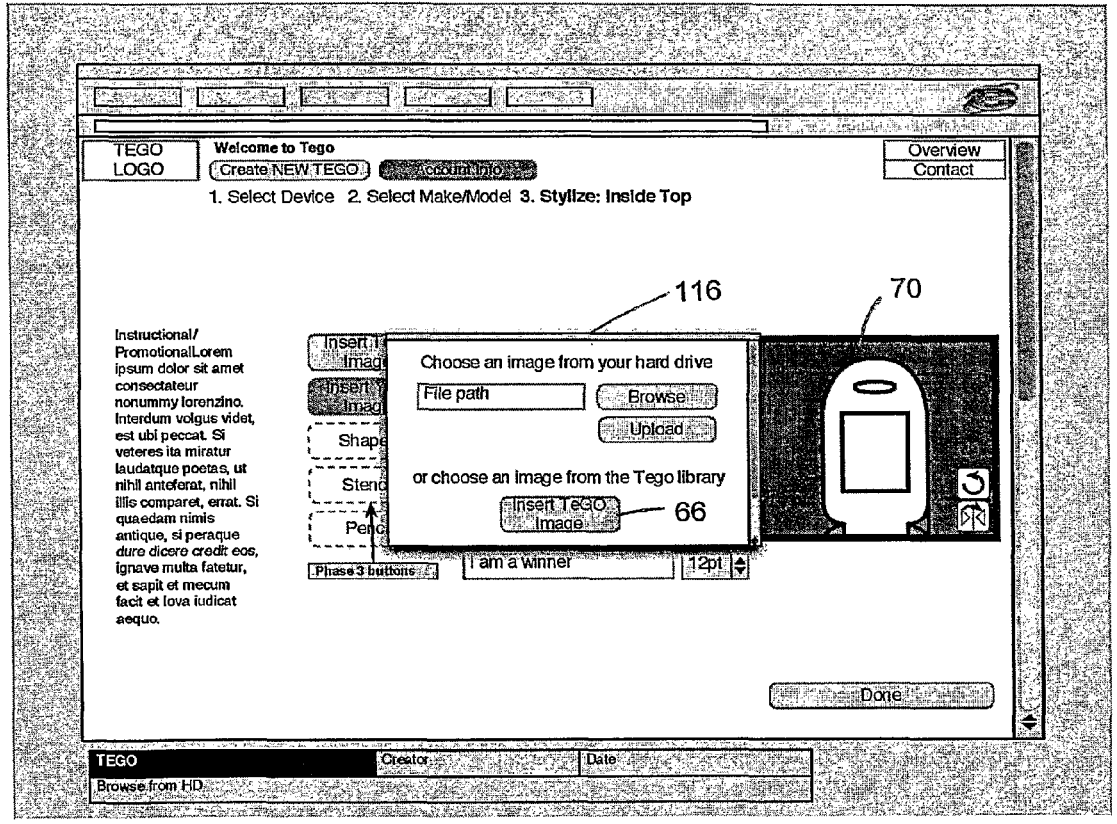
FIG. 10 is a diagram showing one example of a select from hard drive window utilized in the process of FIG. 6.
Figure 11:
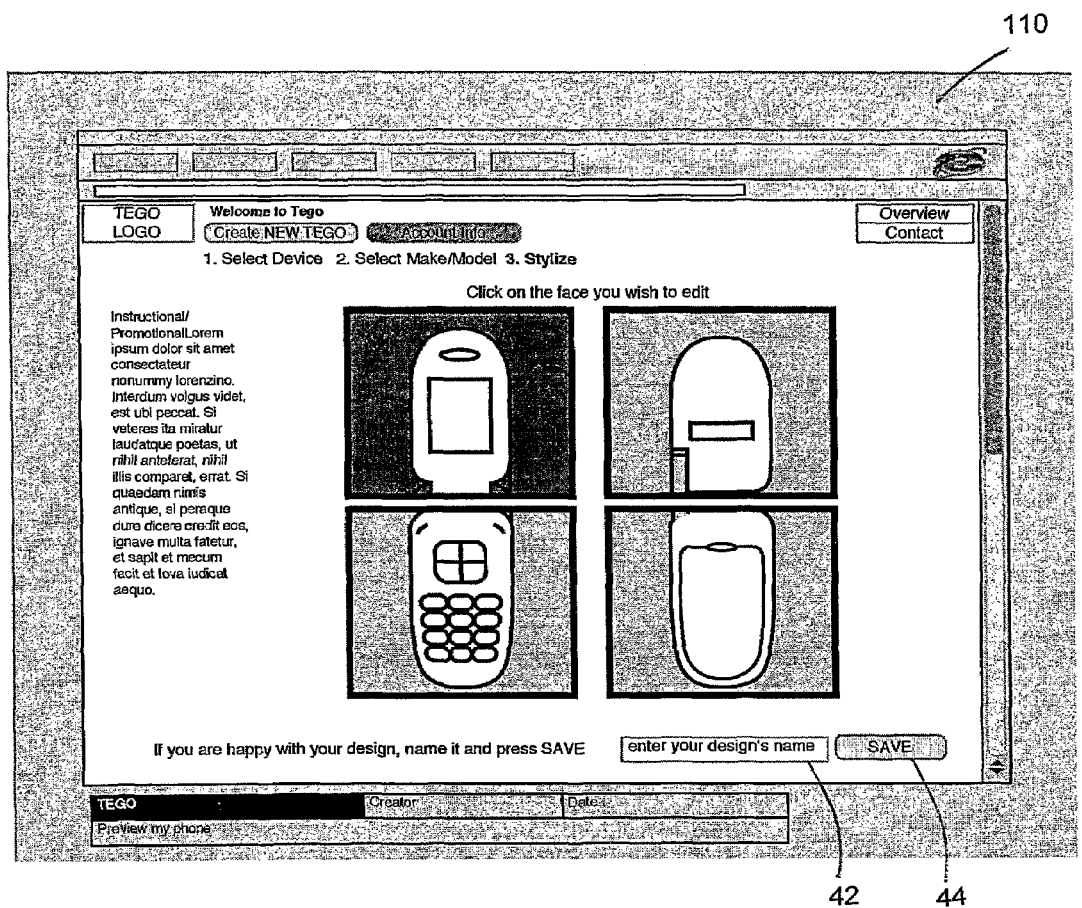
FIG. 11 is a diagram showing one example of a preview web page utilized in the process of FIG. 6.

FIGS. 7-11 are diagrams showing exemplary web pages for stylizing. In particular, FIGS. 7 and 11 show one example of a load congifurator and preview web page 110; FIG. 8 shows one example of a customize surface web page 112; FIG. 9 shows one example of a select from library window 114; FIG. 10 shows one example of a select from hard drive window 116.

Referring to FIGS. 7-11, once the user has selected a specific model of an electronic device, the stylize option is provided. This loads a Flash applet which displays all of the editable surfaces (e.g., 40a, 40b, 40c, 40d), using an outline mask. The user selects any one of these panels 40a-40d to edit a surface on the user's screen. Each surface can be designed separately. As described below, upon completing the design of a selected surface, the user returns to the page 110, which highlights the surfaces that they have completed.

Once the user selects a surface at the web page 110, a design tool is provided to the user through the web page 112. Initially, the user's screen display an initial template 70 associated with the selected surface. Information on the template 70 and created images on the template 70 is passed to an applet.

The user may add multiple images on the template 70.

The user can choose and add a picture background image 50 onto the template 70 using the rich media Flash interface.

The user can select a background image from an image library provided by the server through an "Insert TEGO Image" button 60. Upon clicking the button 60, a new popup window 114 will launch, as shown in FIG. 9. The window 114 allows the user to select an image in a library by category or by attribute name. Once the user have selected the image and clicked "Insert Your Image" button 64, the popup window 114 closes. The Flash movie updates to bring the selected image onto the template 70.

The user can also insert user image 62 prepared by the user through an "Insert Your Image" button 62. Upon clicking the button 62, a new popup window 116 will launch, as shown in FIG. 10. The window 116 allows the user to browse for an image, such as JPG image, on the user's hard drive. Once the user has selected an image and has clicked an "Insert Your Image" button 66, the popup window 116 closes. The Flash movie updates to bring the selected image onto the template 70.

Referring to FIG. 8, the user can add text image onto the template 70. The font style is selectable through a font style box 52. The font size is changeable. The text is sized by through a font size box 56. The test is sizable by dragging the corner of the text box 58 once it is on the screen. The text image is temporarily inserted into a box 58, and then attached to the template 70. The text is available in multi colors 54. The user may add multiple text images on the template 70.

The user is also capable of painting, such as draw lines, rectangles, circles, on the template 70, and selecting colors thereon. The line width is changeable.

The rotation button 64 allows the user to rotate an image on the template 70 using a pointing device, such as a mouse. The user simply drags the image and moves the pointing device to a desired direction (degree increments or decrements). The flipping button 65 allows the user to flip an image on the template 70. A symmetrical image with respect to an axis is displayed on the template 70.

The web page 112 further includes a plurality of functionalities to create and edit an image on the template 70. For example, the functionalities include: image cropping by selecting and dragging an area; image sliding by selecting and dragging an area.

The functionalities further include image resizing modifying aspect ratio by dragging and dropping procedure; image resizing keeping aspect ratio by dragging and dropping procedure. The images on the template 70 are resizable. The user may resize the image by selecting the image and dragging the image with the pointing device.

The web page 112 further allows the user to undo the latest N steps (N>0). The image on the template 70 may be erasable at once.

The web page 112 also allows the user to load an image previously created and customize or adjust it.

Once the customization is completed, the user clicks a "Done" button 72. Then the preview web page 110 of FIG. 11 is displayed. Upon the completion of the surface customization, the user can preview how the cellar phone will look like on the web page 110 of FIG. 11. The web page 110 contains a box 42 through which the user can name his customized design. The page 110 contains a "Save" button 44 by which a customized template is saved. The customized template includes an original template imposed on manipulated image(s), and may include positioning information and order information. The order information may include any identification for identifying the user's order. The order information may be visible on the user's screen with the template or invisible. The order information may be embedded into the customized template except for an area having the created image.

Referring to FIG. 1, the customized template is sent to the server 10. The database 16 stores information on the customized template. The customized template may be in raster based format (such as JPG, TIFF, PNG) or in a vector based format.

The customized template may be converted with appropriate dimensions or format associated with the printer/cutter 12 by the manager 14.

The customized template may be delivered to different manufacturing locations where a cover with the image is produced.

The cover customizer may allow the user to design images to put on "wallpaper or screensaver that matches or is complementary to images created at the web pages 112.

Figure 12:
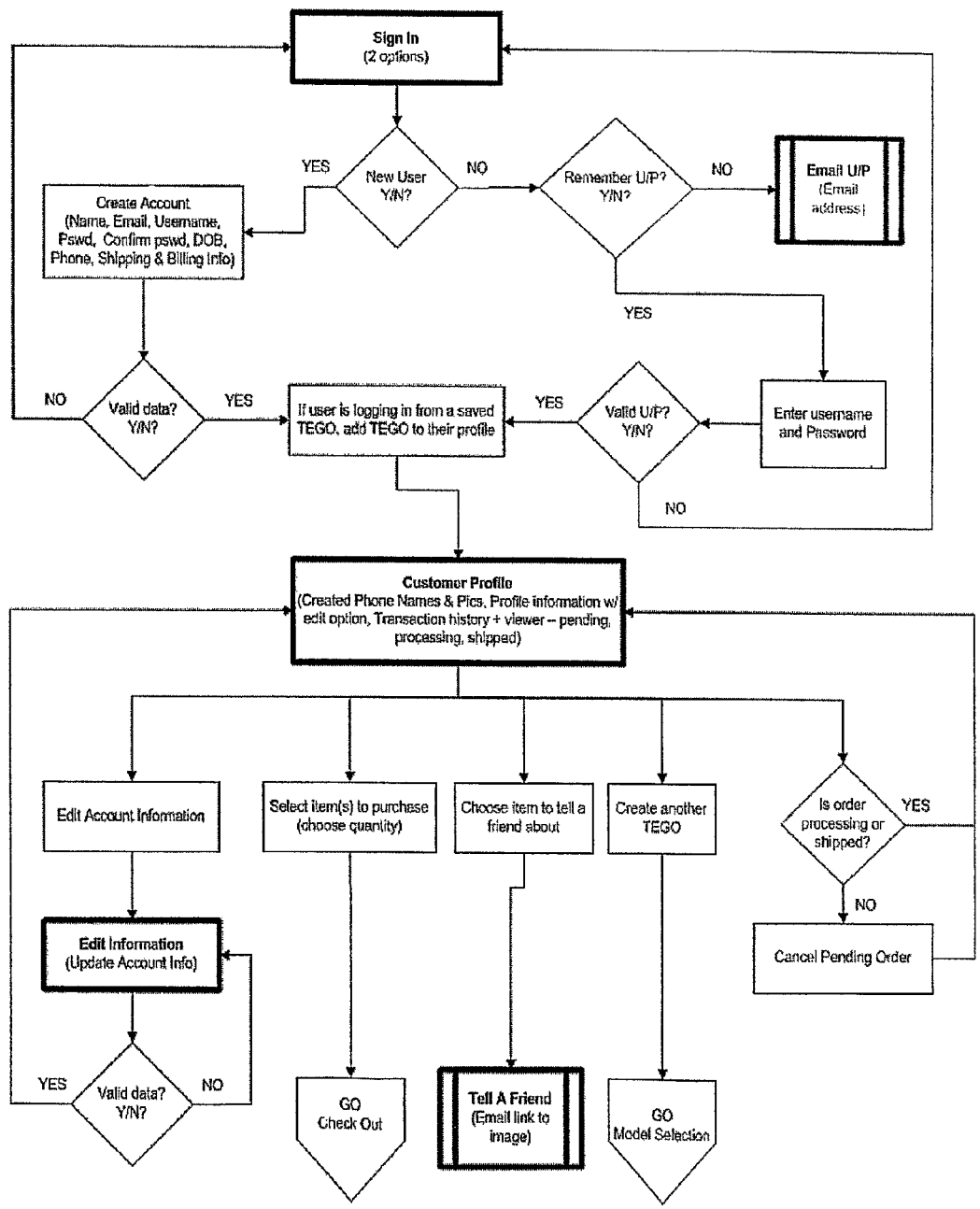
FIG. 12 is a flow chart showing an exemplary process for login.

The login process is now described in detail. FIG. 12 is a flow chart showing an exemplary process for the login. The user can login into his profile as shown in FIG. 12.

Figure 13:
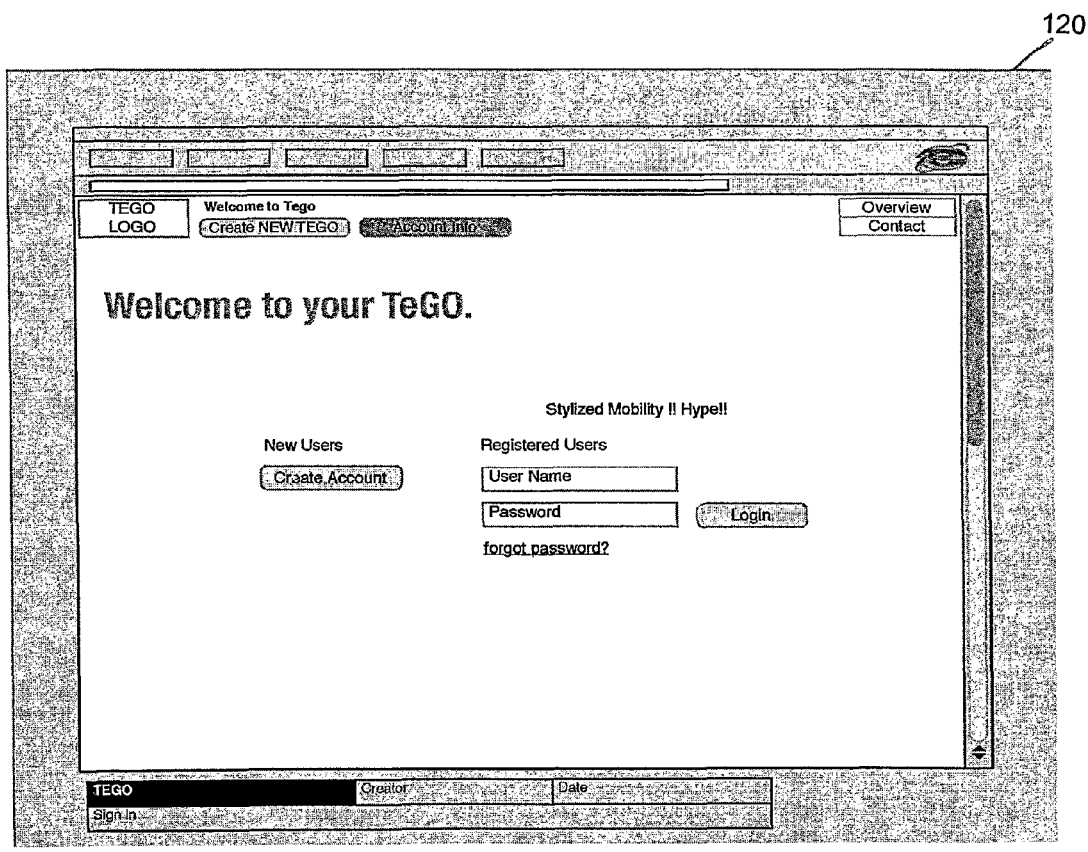
FIG. 13 is a diagram showing one example of a sign in web page utilized in the process of FIG. 12.
Figure 14:
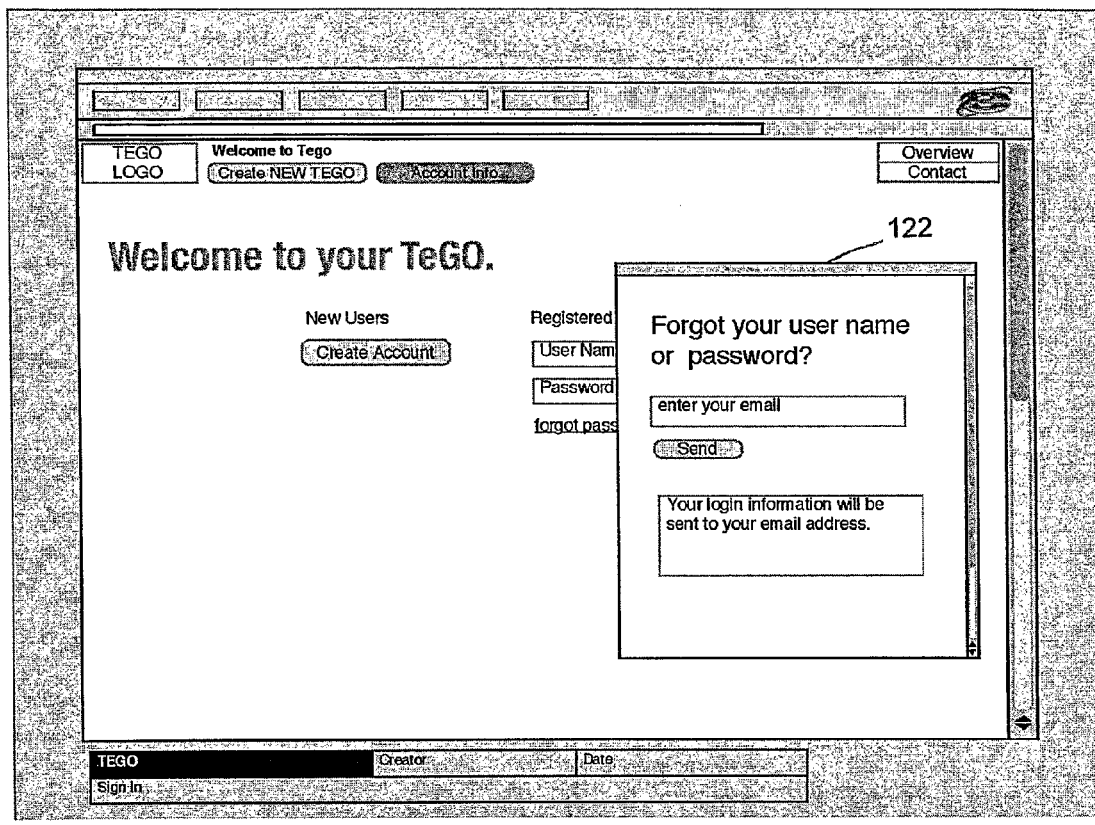
FIG. 14 is a diagram showing one example of a email up window utilized in the process of FIG. 12.
Figure 15:
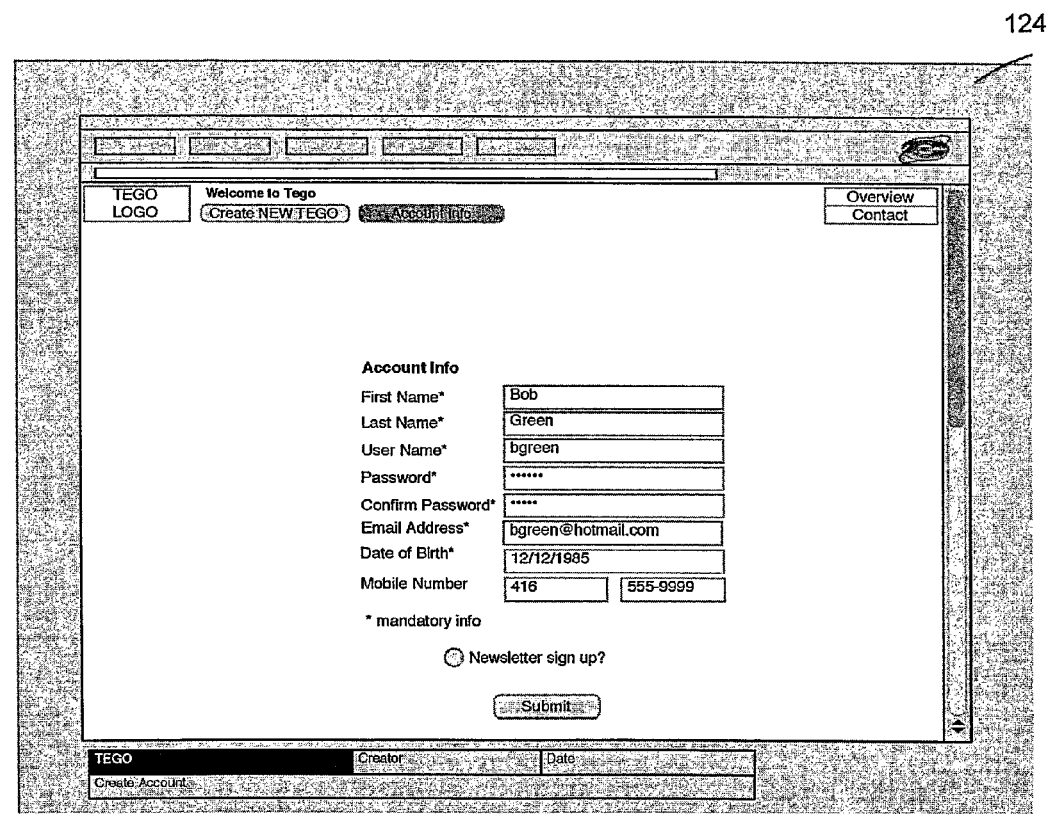
Figure 16:
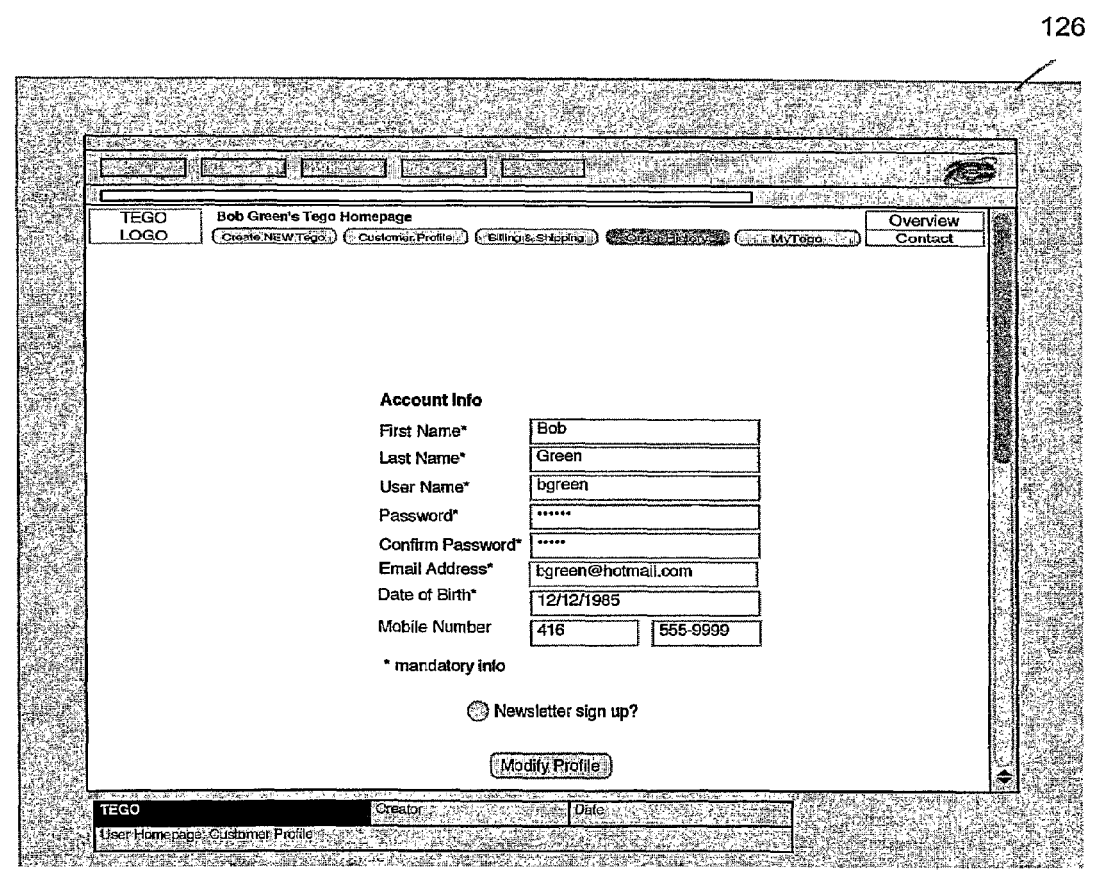
Figure 17:
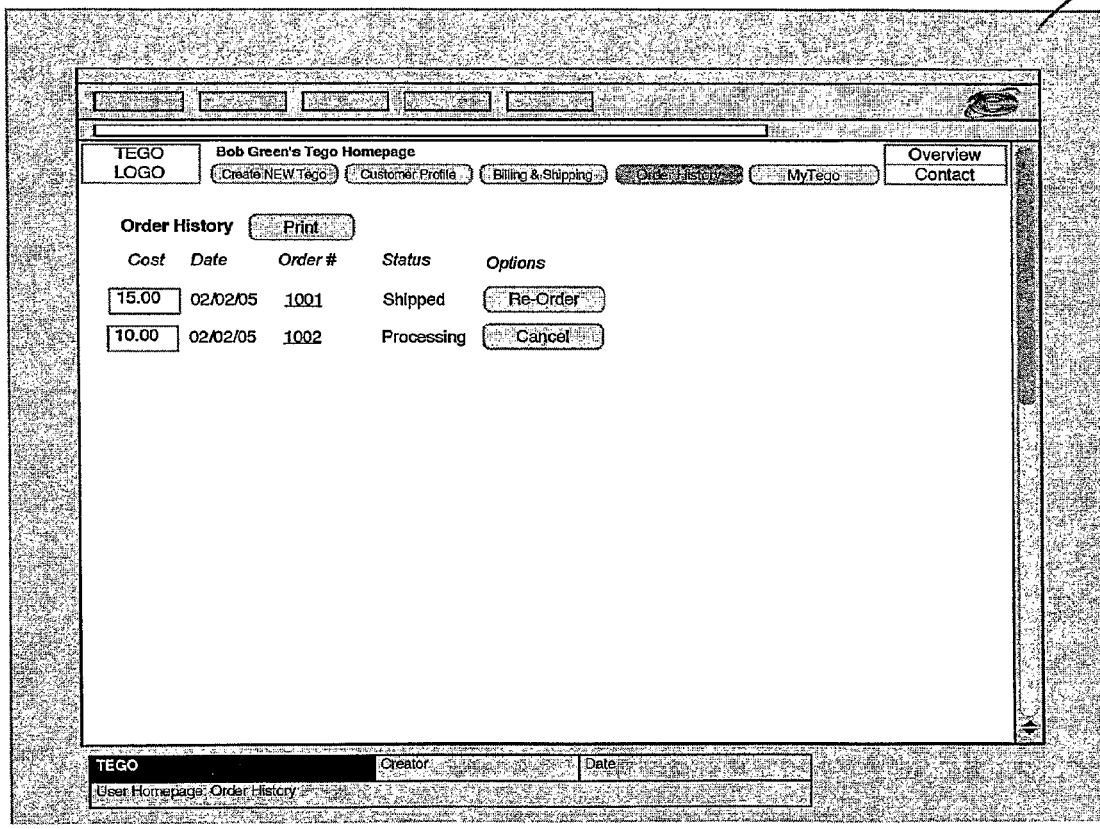
FIG. 17 is a diagram showing one example of an order history web page utilized in the process of FIG. 12.
Figure 18:
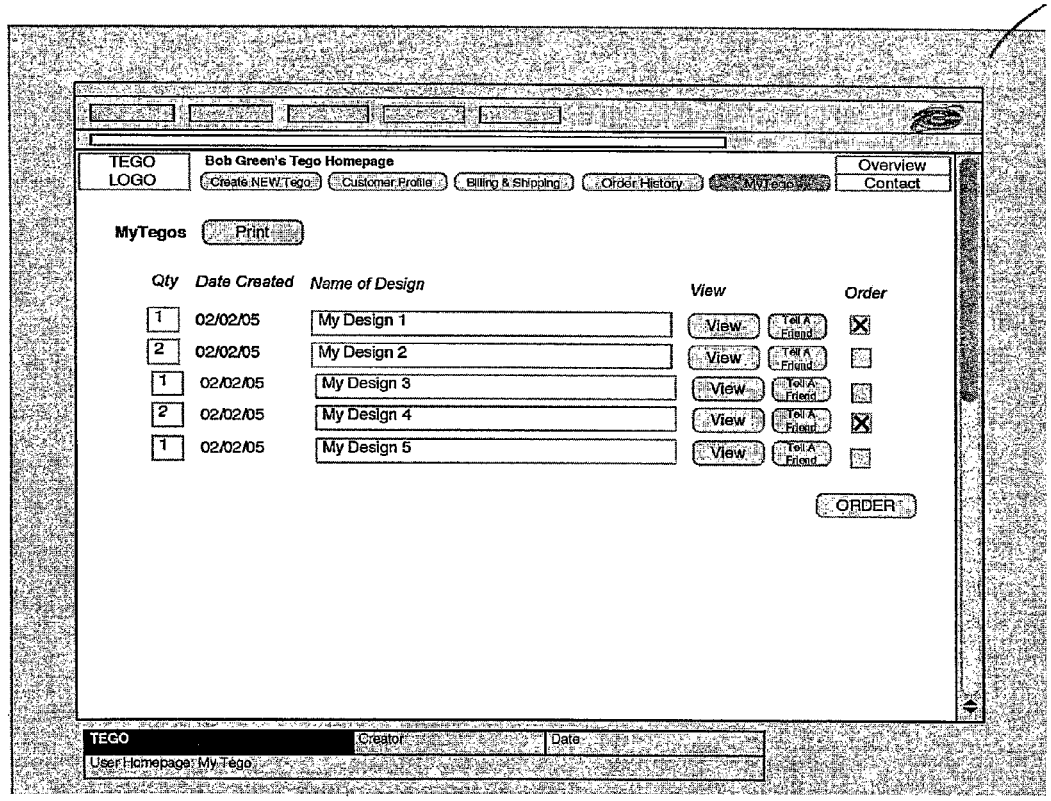
FIG. 18 is a diagram showing one example of a my design list web page utilized in the process of FIG. 12.
Figure 19:
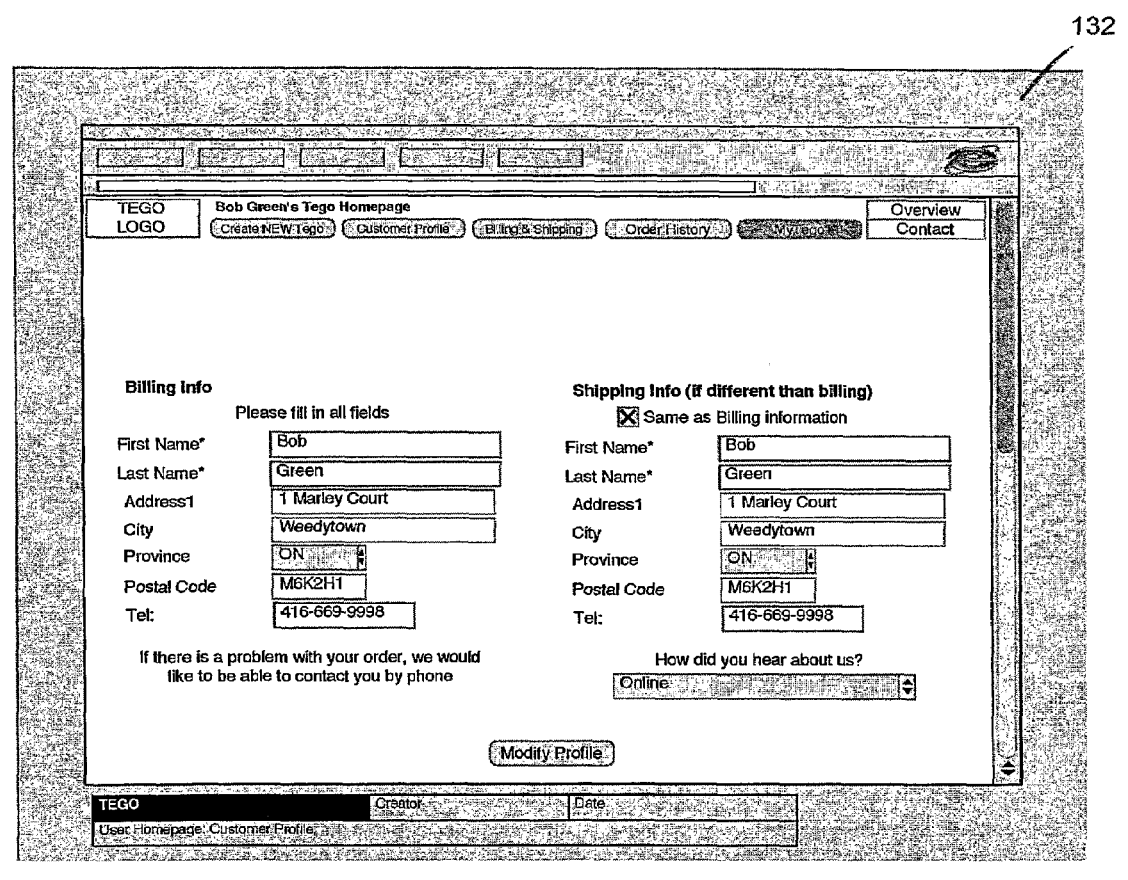

FIGS. 13-19 are exemplary web page views applicable to the login process of FIG. 12. In particular, FIG. 13 shows one example of a sign in web page 120; FIG. 14 shows one example of a email up window 122, FIG. 15 shows one example of a customer profile web page 124; FIG. 16 shows one example of an edit information web page 126; FIG. 17 shows one example of an order history web page 128; FIG. 18 shows one example of a my design list web page 130; FIG. 19 shows one example of a billing/shipping information web page 132.

Referring to FIG. 13-19, if the user wishes to login to see their information, or they are saving a phone and have not logged in yet, they will be sent to the web page 120. In the event that the user has forgotten their username/password, they can enter the email address they registered with at the window 122, and that will send them an email with their login information.

If a user is signing up for the first time, they will need to fill in all of their personal information into boxes in the web page 124 to receive an account.

Upon registering, they will be able to go back and edit their profile at anytime at the web page 126.

Once an order has been made, users can check their order history at the web page 128 by logging into their profile, and if the order has not yet been shipped, they can cancel it.

As shown in the web page 130, a plurality of customized templates can be saved, with the ability to order them at anytime.

Users also can change their billing and shipping information at anytime at the billing and shipping information web page 132. By default, this information is set to their user account information, with the shipping information set as the same as the billing.

Figure 20:
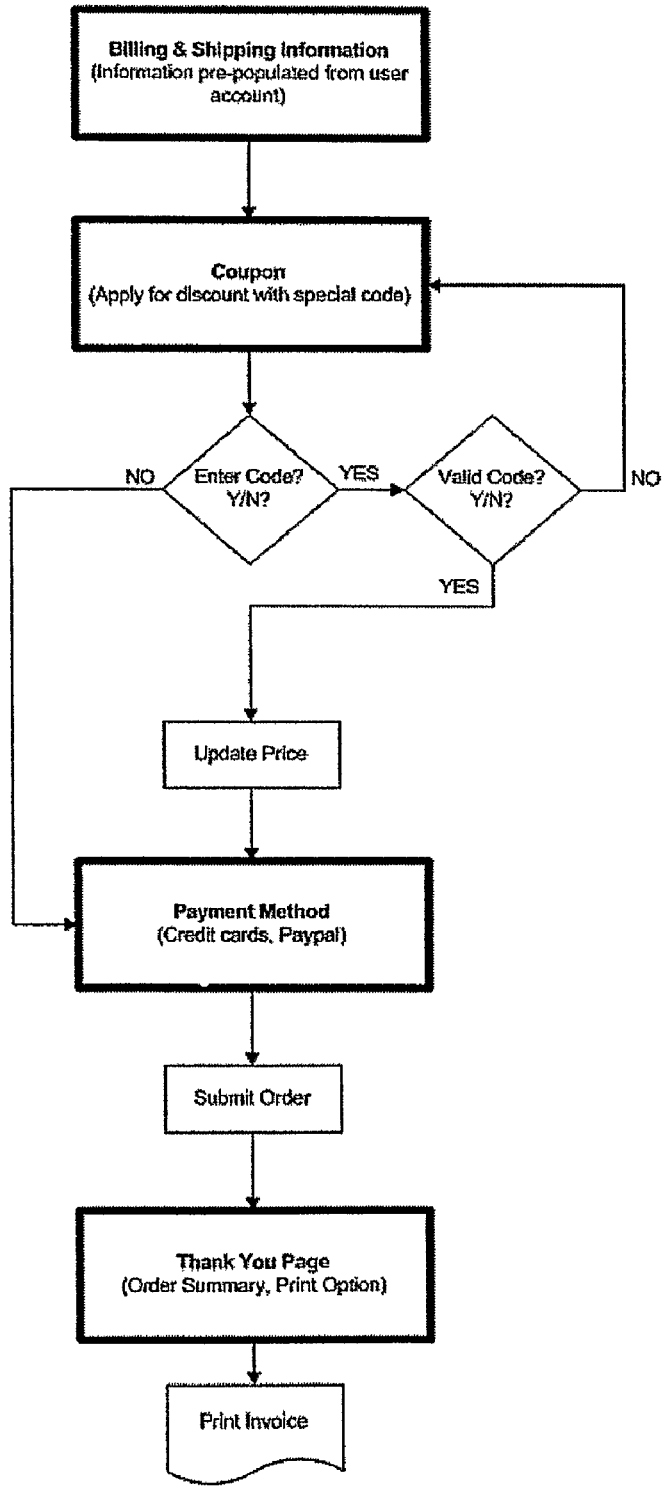
FIG. 20 is a diagram showing an exemplary process for checkout.

FIG. 20 is a diagram showing an exemplary process for checkout. Each box in FIG. 20 represents the user's experiences in purchasing their selected images.

Figure 21:
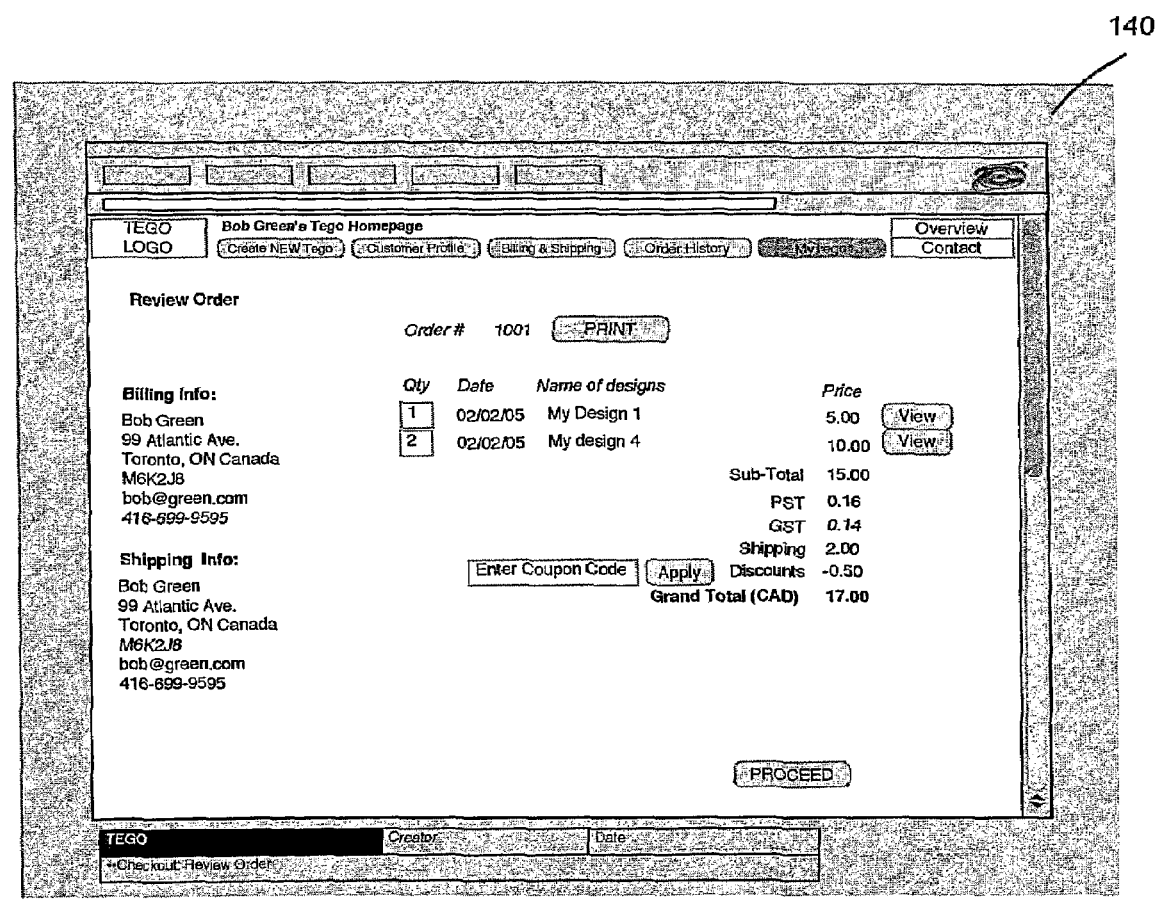

Once a user has selected the phones they wish to order, they are taken to the checkout screen (an order summary/payment method web page 140 of FIG. 21). From this page 140, they can review their order details, and enter in any coupon codes to receive special discounts on their phone. They then select the type of payment option they would like to make.

Figure 22:
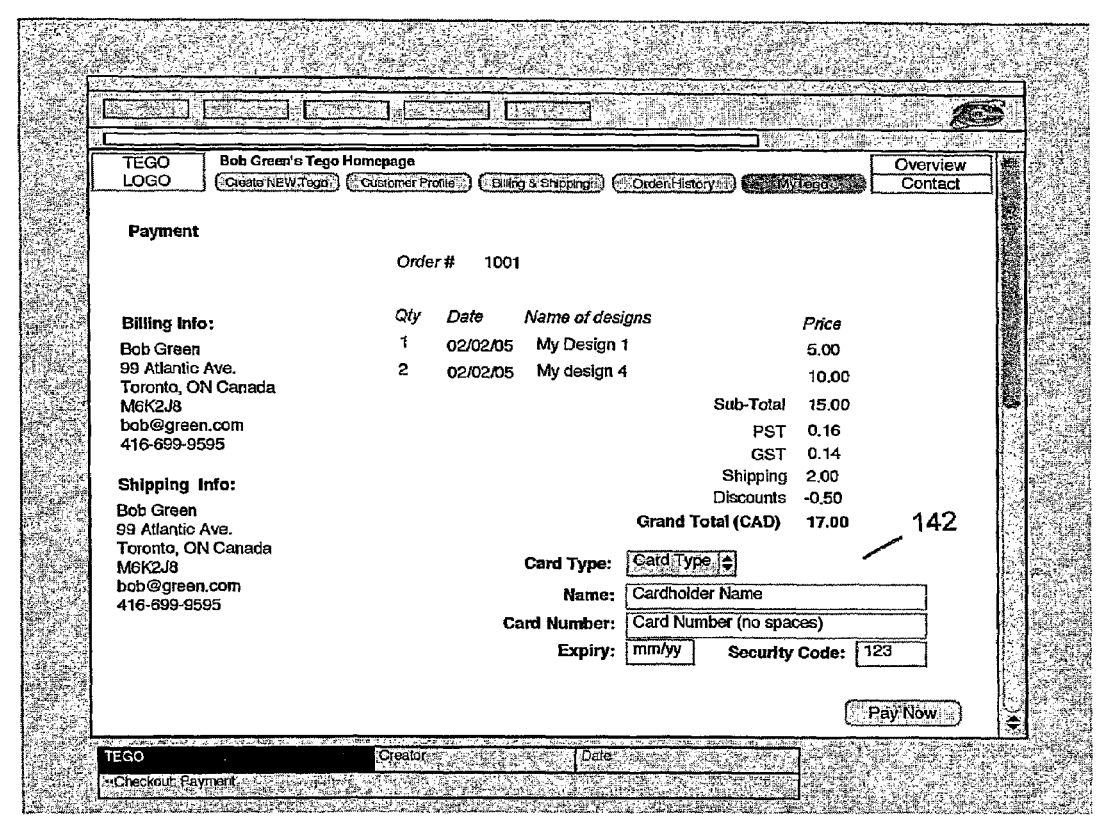

Once selected, the user can enter their credit card information through a credit card information view 142 of FIG. 22. This is done securely using a specific payment method.

Upon completing their transaction, the user is presented with a print-friendly record of their transaction at a payment confirmation view 144 of FIG. 23

Figure 24:
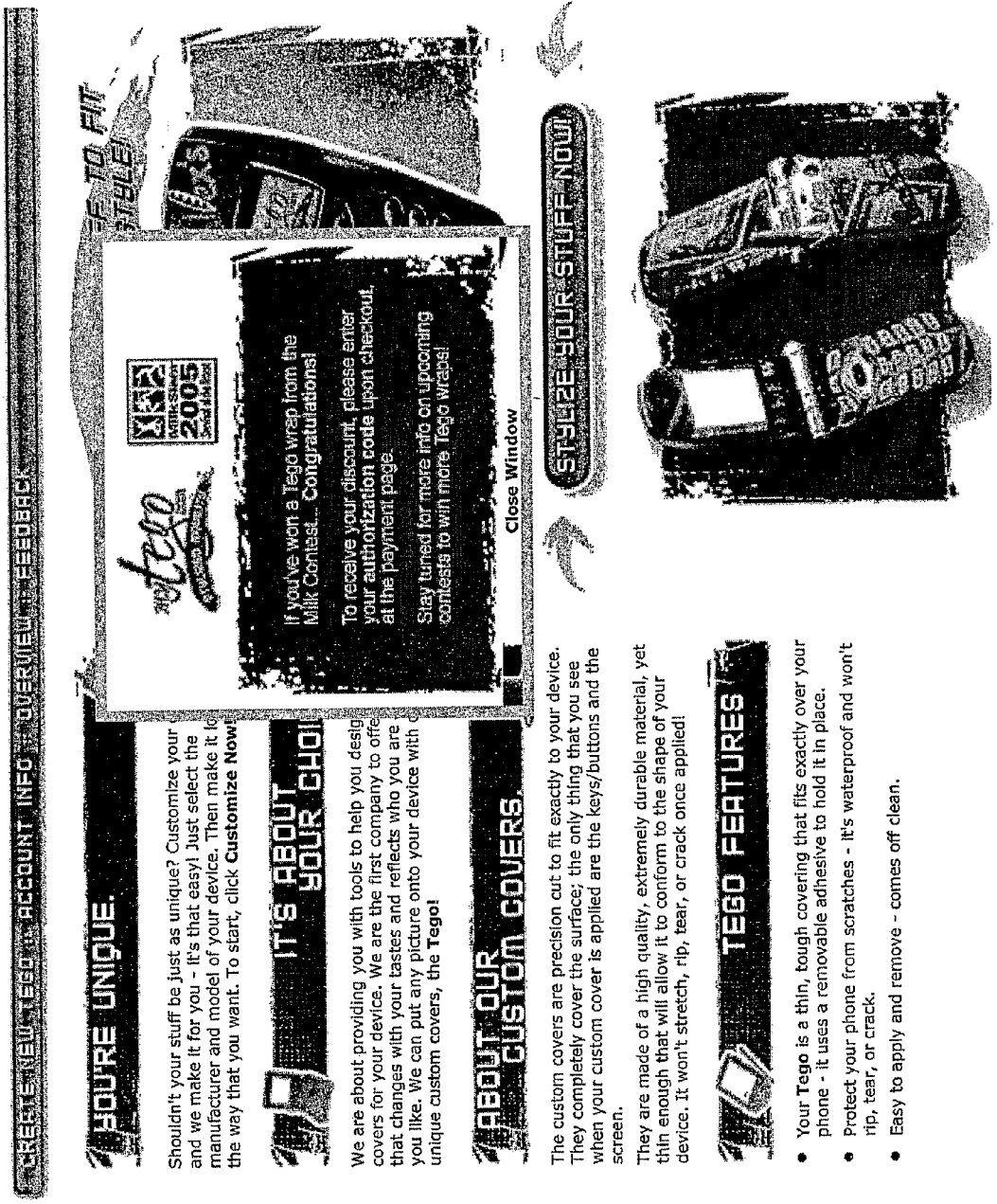
FIG. 24 is a diagram showing an example of a home page utilized in the process of FIG. 2.
Figure 25:
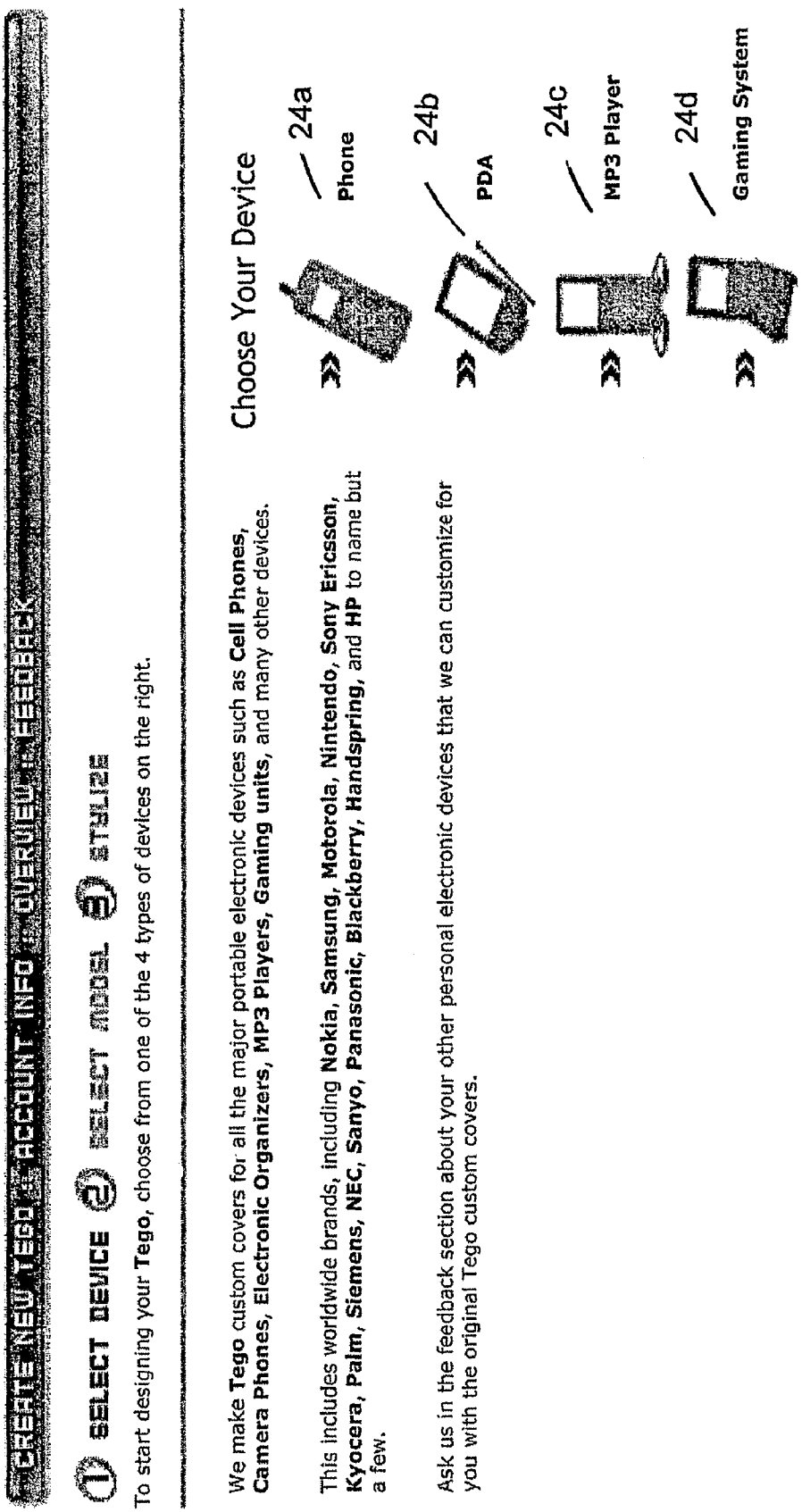
FIG. 25 is a diagram showing additional example of a select electronic device web page associated with FIG. 24.
Figure 26:
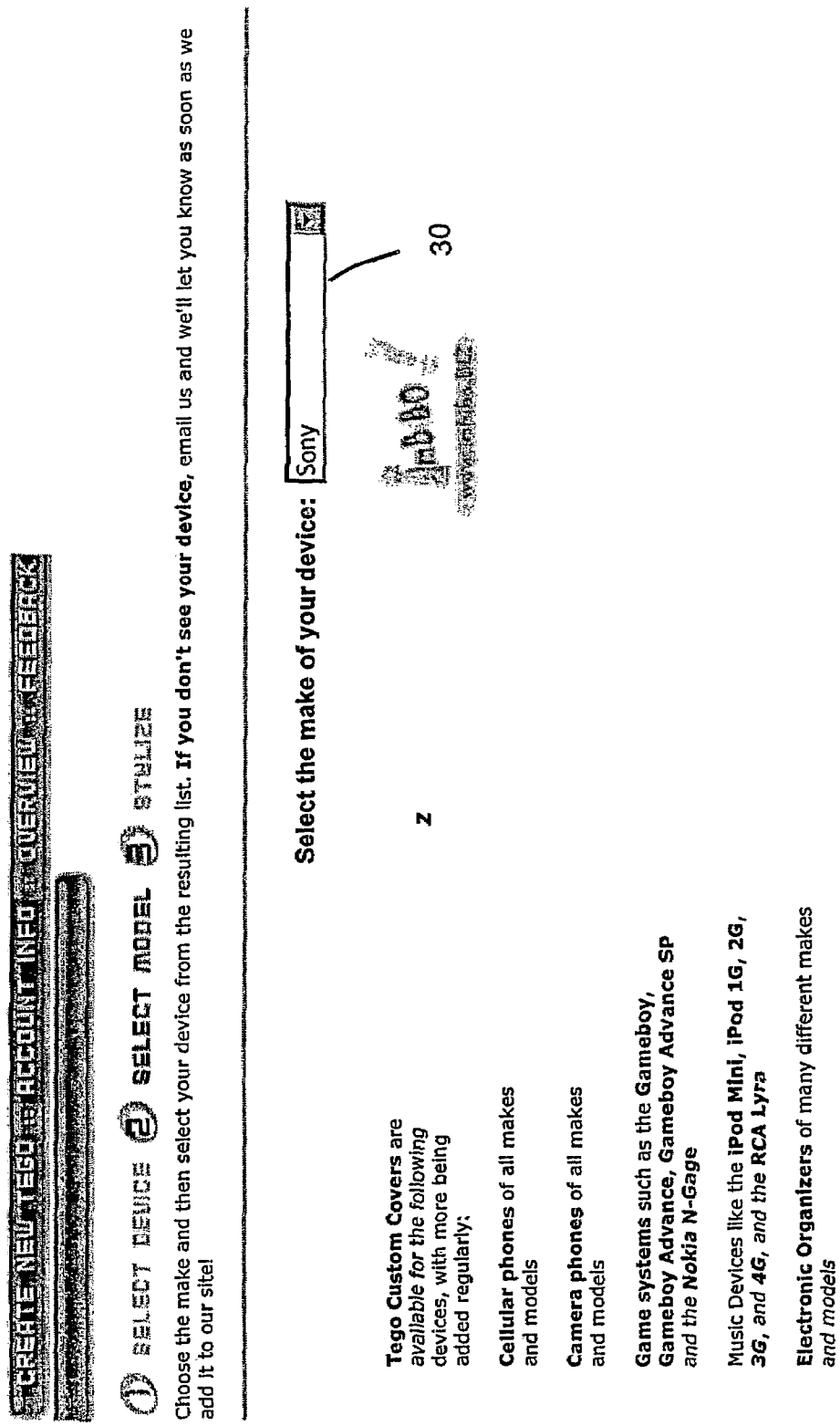
FIG. 26 is a diagram showing additional example of a select device make web page associated with FIG. 24.
Figure 28:
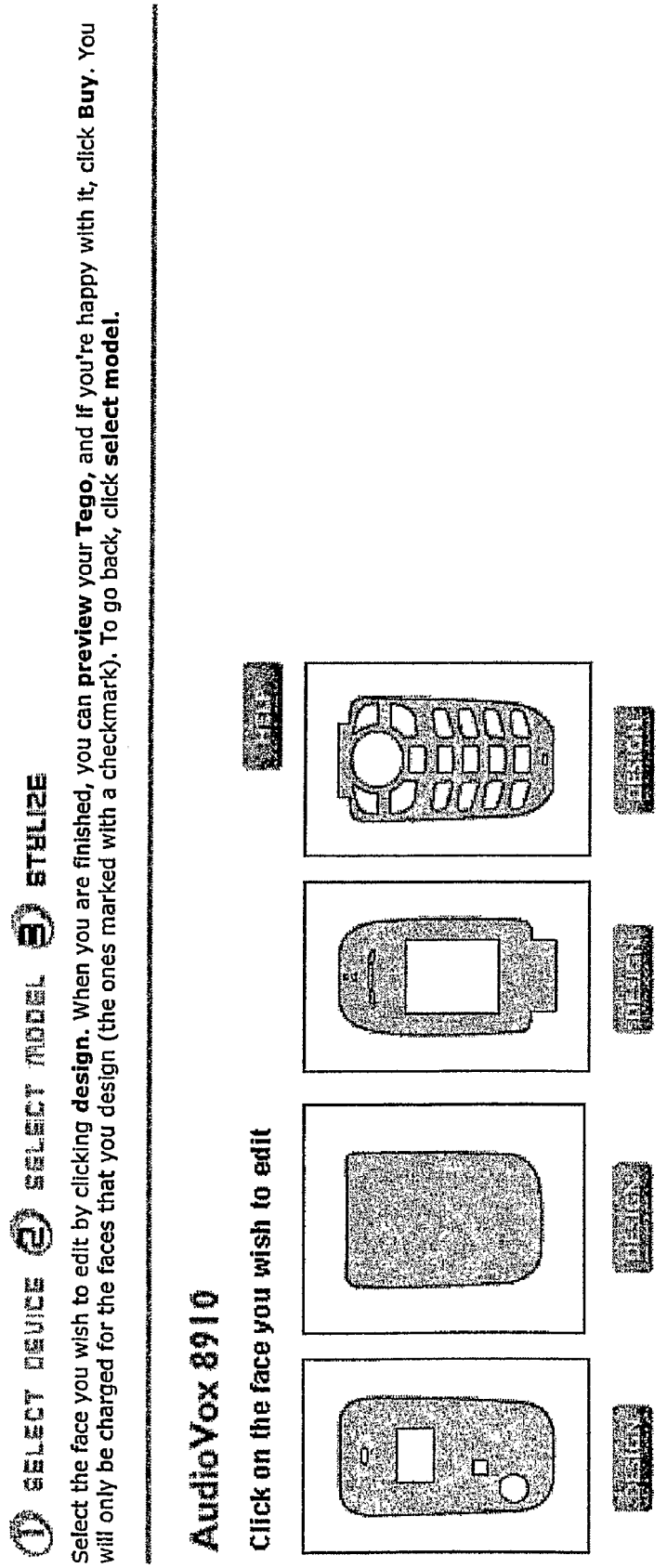
FIG. 28 is a diagram showing additional example of a customize surface web page associated with FIG. 24.
Figure 29:
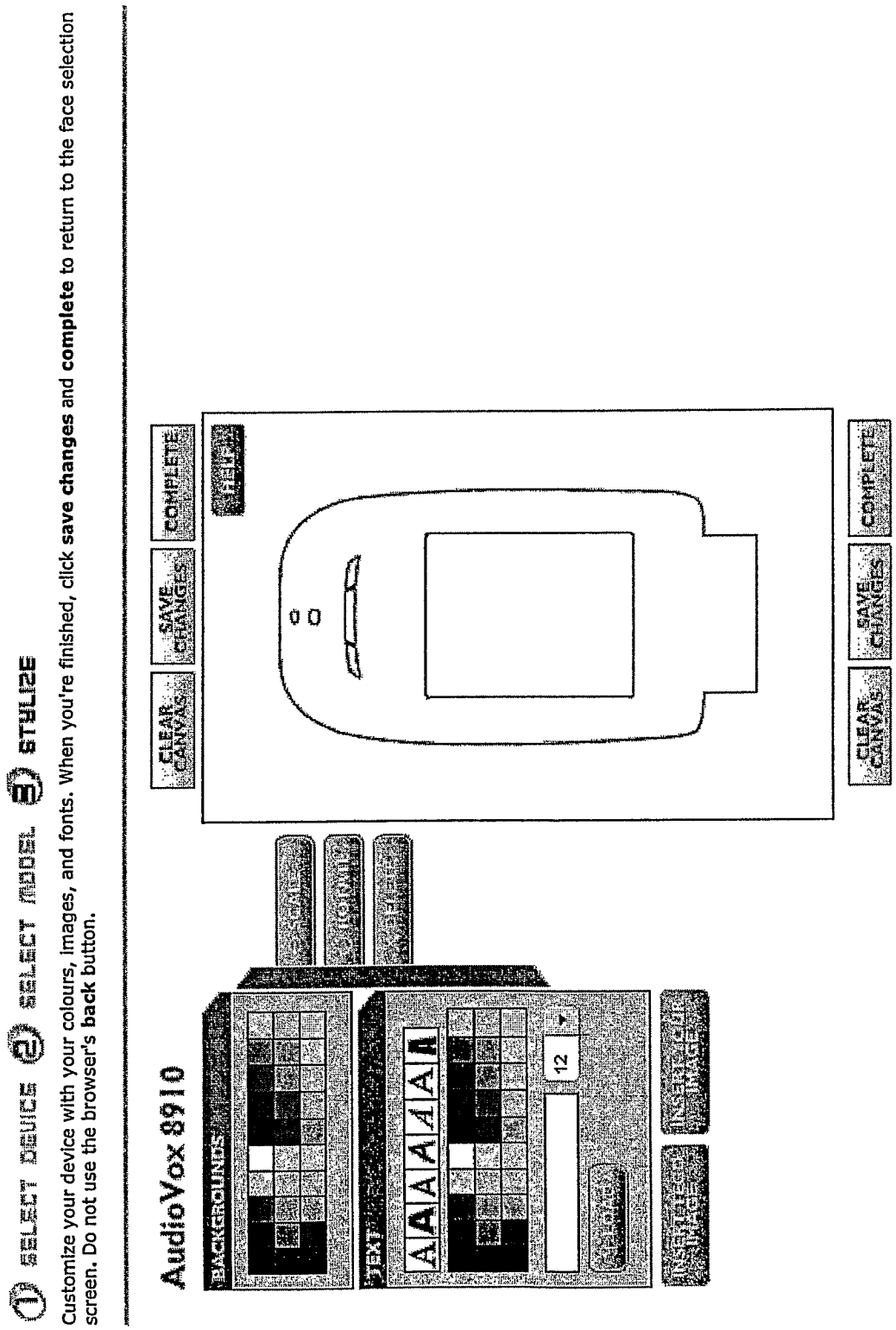
FIG. 29 is a diagram showing additional example of a editing web page associated with FIG. 24.
Figure 30:
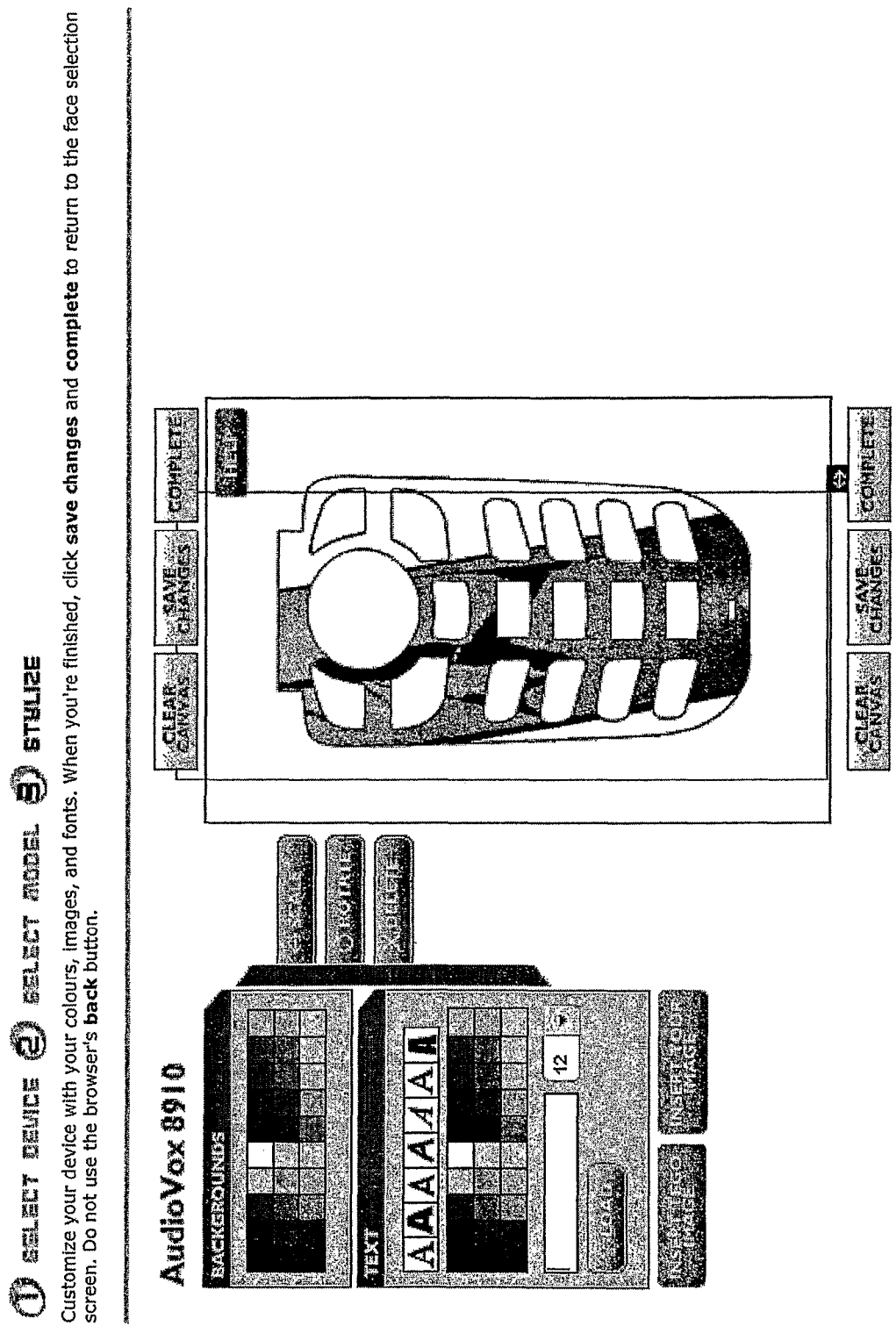
FIG. 30 is a diagram showing image on an template at the editing web page of FIG. 29.
Figure 31:
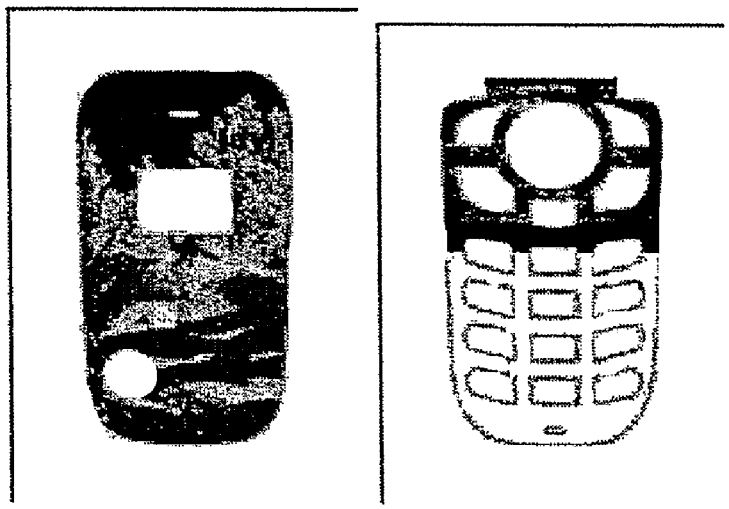
FIG. 31 is a diagram showing additional example of a preview web page associated with FIG. 24.
Figure 33:
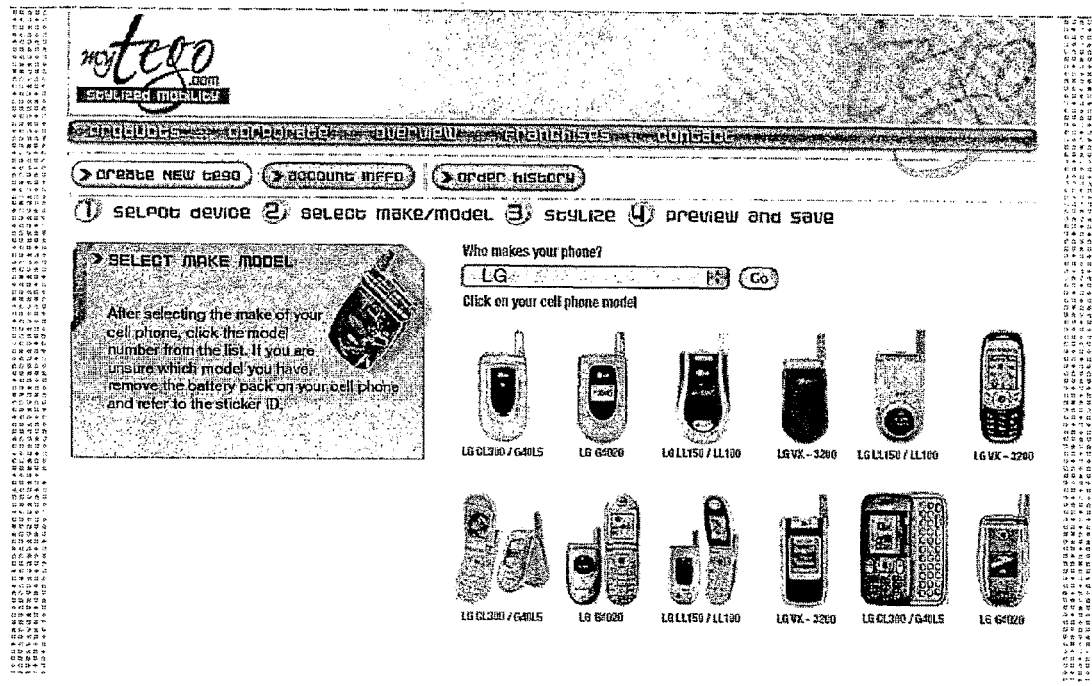
FIG. 33 is a diagram showing further example of a select model web page associated with FIG. 2.

FIGS. 24-33 are another sets of exemplary web pages for implementing the design customizer. FIG. 24 shows one example of a home page. Once a user clicks a "stylize your stuff now" button, the web page of FIG. 25 is displayed. The user selects one electronic device using the buttons 24a-24d. Then, a select device make web page of FIG. 26 is displayed. The user selects a manufacturer of the selected electronic device. Then, all models provided by the manufacturer are displayed as shown in FIGS. 27 and 33. The user is prompted to select a surface to be edited at the web page of FIG. 28. The user can create design for multiple surfaces. FIGS. 29-30 shows design tools. In FIG. 30, a background image on the template 70 is edited as describe above. Once the user completes the design process, a preview web page of FIG. 31 is displayed. The user orders a cover with his created image through the web page of FIG. 32.

COMPARATIVE EXAMPLE

The features described in the various examples of the present invention were compared against existing web-based options (Website A, B, or C) available to the public for ordering a design for a cover to be used with an electronic device. The results of this comparison are summarized in the following table with availability of a feature being indicated by "Y".

| # | Non-limiting exemplary features of the present invention | Present Embodiment | Website A | Website B | Website C |
|---|---|---|---|---|---|
| 1 | Print on vinyl | Y | | Y | Y |
| 2 | Possible to apply to any electronic device | Y | | Y | |
| 3 | Client may use image library | Y | | Y | Y |
| 4 | Client may design each face separately | Y | | | |
| 5 | Client may upload own image from hard drive | Y | Y | Y | |
| 6 | Website provides template for multiple | Y | | | |

-continued

| # | Non-limiting exemplary features of the present invention | Present Embodiment | Website A | Website B | Website C |
|---|---|---|---|---|---|
| | devices | | | | |
| 7 | Passing Template/Selected Image Information To Applet | Y | Y | | |
| 8 | Original Template Imposed on Selected Image | Y | Y | | |
| 9 | Image Sliding - Using Mouse | Y | Y | | Y |
| 10 | Image Cropping - Drag And Select Area | Y | | | |
| 11 | Image Rotation - Degree Increments - Using Mouse To Drag Image | Y | | | |
| 12 | Typing Text - Five fonts, Resizable through font sizing controls, available in multiple Colors | Y | Y (2 fonts) | | Y |
| 13 | Simple Painting - Draw Lines, Rectangles, Circles - Multiple Colors, Line Widths | Y | Y | | |
| 14 | Rotate text | Y | | | Y |
| 15 | Undo - Last 10 Steps | Y | Y | | |
| 16 | Image Resizing Modifying Aspect Ratio - Drag and Drop | Y | Y | | |
| 17 | Image Resizing Keeping Aspect Ratio - Drag and Drop | Y | Y | | Y |
| 18 | Put multiple images on same face | Y | | | |
| 19 | Design images to put on "Wallpaper" or screensaver that matches or is complementary to Customized Template | Y | | | |
| 20 | Ability of customer to customize/adjust template | Y | | | |
| 21 | Embedding Order Information with Customized Template | Y | | | |
| 22 | Save Customized Template - Original Template associated with Manipulated Image | Y | Y | | |
| 23 | Saved Customized Template image is set as raster format, and is manually configured in vector based software before sending to printer/cutter | Y | | | |
| 24 | Saved Customized Template image is vector based and can be sent directly to printer/cutter | Y | | | |
| 25 | Delivery of images to different manufacturing locations | Y | | | |
| 26 | Convert Customized Template with Appropriate Dimensions for printer/cutter | Y | | | |

Using Website A required uploading a client's image with no option of selecting an image from a library. Only a cell phone template for particular models of a single manufacturer was made available. Only a single template corresponding to a single surface could be designed. The user is forced to print the design on paper and manually cut or separate the design from the print sheet. Moreover, the paper design must be inserted underneath a clear plastic cover. As such, website A is not only restricted with respect to device makes, and number of templates per device, but also fails to produce a cover. Instead, Website A only allows the client to produce a paper insert.

While Website B provides a cover for an electronic device as an end result, it does not provide a client with any options for editing, manipulating, or modifying a selected image.

Website C is involved in the production of customized decals, and does not relate to covers for an electronic device. While this website provides limited functions for manipulating images, no templates are provided. Furthermore, image sizes are set for many of the designs, and in other cases a minimum size is imposed. Accordingly, decals produced by this method may not be properly sized for a particular device. Also cannot upload images from hard drive.

The cover customizer may be implemented by any hardware, software or a combination of hardware and software having the above described functions. The software code, either in its entirety or a part thereof, may be stored in a computer readable medium. Further, a computer data signal representing the software code which may be embedded in a carrier wave may be transmitted via a communication network.

In the above description, software related to the cover customizer is used on the website-based environment. However, the software may be used in a local environment, such as a retail. For example, the software may be located "locally" either through retail type operating store locations, or stand-alone, unmanned kiosks—where the customer would have walk up access.

The details of manufacturing a cover are disclosed in U.S. patent application Ser. No. 10/993,310 filed on Nov. 19, 2004, entitled "Protective Cover For Electronic Device", which is hereby incorporated by reference in its entirety. The method of producing a customized protective cover for an electronic device may comprise a) receiving an image or the like from a person wishing to customize the electronic device with a protective cover, as described herein; b) if necessary, converting the image or the like into electronic format; c) obtaining the dimensions of the electronic device; d) formatting the image for transfer to the protective cover of the electronic device; and e) transferring the image onto a surface layer of the protective cover. The method may optionally comprise a step of cutting the protective cover after the image or the like has been transferred thereto. Also, as described previously, one or more laminates may be applied to the protective cover after the image has been transferred thereto.

The image or the like to be transferred to the protective cover may be provided in electronic format as is known in the art. Alternatively, the image or the like may be provided in "hard-copy" and subsequently transferred into an electronic format, for example, but not limited to by scanning or the like. In this manner the image or the like may be manipulated, for example, but not limited to resized, stretched, shrunk or the like. Further, the image may be manipulated by changing one or more colors contained therein, objects in the image may be removed, replaced or electronically "painted over", multiple images may be combined or overlaid, text may be added, and the like. In this manner, the protective cover may be customized as to the needs and/or desire of the user of the electronic device. However, it is also possible that a person may select a protective cover that already comprises an existing image, design, picture or the like.

The protective cover for an electronic device, as described herein, may include: a) a surface layer comprising vinyl, plastic, rubber, silicone, acrylic or a combination thereof, and; b) an adhesive layer or coating for affixing the protective cover to the electronic device. The protective cover for the electronic device may further comprise a release liner or backing strip that protects the adhesive layer from engaging surfaces when the protective cover is not in use, for example, but not limited to, when the protective cover is not affixed to the electronic device.

The adhesive layer or coating permits the protective cover to be affixed to an electronic device. Adhesives that may be employed in the adhesive layer include pressure sensitive adhesives. The protective cover may comprise pressure sensitive adhesives comprising vinyl, silicone, acrylic, rubber or a combination thereof. However, other adhesives may also be employed to affix the protective cover to the electronic device.

The protective cover described above may comprise a vinyl or acrylic pressure sensitive adhesive. For most applications, vinyl or acrylic adhesives provide a suitable range of performance characteristics enabling the protective cover to remain adhered through a wide variety of environmental conditions. However, rubber and/or silicone adhesives may also be employed in the adhesive layer or coating. For example, but not to be considered limiting in any manner, in instances wherein an electronic device may be exposed to high temperatures, or where the electronic device may generate substantial heat, it may be preferable to employ a silicone-based adhesive. Alternatively, it may be preferable to employ a rubber-based adhesive in instances where a strong, essentially permanent bond between the protective cover and electronic device is desired at temperatures in the range of about 15° C. to about 30° C. However, the use of such adhesives, alone or in combination is not meant to be limited to the particular conditions endured or created by the electronic device.

As will be evident to a person of skill in the art, a pressure sensitive adhesive such as, but not limited to a vinyl pressure sensitive adhesive may comprise a protective cover as described herein provided it comprises a surface layer (ie. vinyl) and an adhesive layer or coating. Alternatively, a layer of vinyl without adhesive attached may be employed, after which the adhesive layer could be placed separately thereon. The adhesive may be applied to the vinyl or other suitable surface in any manner known in the art, for example, but not limited to, via a spray or other application.

Suitable adhesives may be obtained from a variety of suppliers known in the art, for example, but not limited to Avery Dennison.

The adhesive layer or coating may be chosen such that the protective cover is removable from the electronic device or repositionable after being affixed thereto. For example, but not wishing to be limiting in any manner, the protective cover may be peeled off the electronic device when desired. In such an embodiment, a vinyl or acrylic pressure sensitive adhesive is preferred, more preferably a light tack adhesive. Alternatively, the adhesive layer or coating may be permanent or essentially permanent, such that the protective cover is non-removable or essentially non-removable from the electronic device after being affixed thereto. In such an embodiment, the protective covers, may be affixed over top of one or more previously affixed protective covers.

The protective cover is preferably flexible permitting it to be wrapped around one or more sides of the electronic device. Further, the protective cover may be wrapped around other parts of the electronic device, for example, buttons, antennas and the like, if desired, and thus it is preferred that the protective cover also be tear resistant. Also, it is preferable that the protective cover does not obstruct the functionality of the electronic device.

Without wishing to be limiting, the protective cover is substantially non-stretchable. By the term "substantially non-stretchable" it is meant capable of being deformed, for example stretched along an axis by less than about 200% of its normal size, more preferably less than about 100%, still more preferably less than about 50%, and still more preferably less than about 30%, without resulting in destruction, for example, but not limited to tearing of the protective cover.

The protective cover may be contoured to conform to the shape of an electronic device. Further, the protective cover may comprise one or more apertures, tear away sections, peel away sections, punch out sections, for example, but not limited to die punched sections permitting parts of the electronic device such as, but not limited to controls, dials, buttons, antennas, input jacks/output jacks, displays, microphones, speakers, signal ports (i.e. infrared signal ports), hardware connector ports, software connector ports, battery compartments and the like of the electronic device to be surrounded, but not covered by the protective cover. However, in a separate embodiment, which is not meant to be limiting, it is also contemplated that the protective cover may be affixed over or around one or more controls, keypads, dials, buttons, antennas, input jacks/output jacks, display screens, microphones, speakers or the like, preferably without substantially affecting the function of the control, dial, sound transmission, etc. Combinations of the embodiments are also possible.

The apertures, tear-away sections, peel away sections, punch out sections and the like may be created by any suitable process known in the art, for example, but not limited to a die cutting process, a contour cutter or any other cutting device that is capable of cutting a set pattern or outline for the electronic device.

A protective cover may alternatively comprise: a) a layer comprising vinyl, plastic, silicone, rubber, acrylic or a combination thereof, b) an adhesive layer or coating for affixing the protective cover to the electronic device; and c) one or more a liquid laminates, solid laminates, or a combination thereof applied to the layer comprising vinyl, plastic, silicone, rubber, acrylic or a combination thereof.

Alternatively, the protective cover may comprise a layer comprising paper, an adhesive layer or coating for affixing the protective cover to the electronic device and optionally, one or more liquid laminates, solid laminates, or a combination thereof applied to the paper layer.

Preferably one or more laminates are employed after an image or the like has been printed on the vinyl or plastic layer. The addition of the laminate seals the print and enhances durability of the protective cover. It is also contemplated that the protective cover may comprise multiple laminates, either of the same or different kinds to further increase the durability of the protective cover.

The protective cover described herein may comprise dimensions such that it capable of covering a single side or face of the electronic device, or a portion of a single side or face of an electronic device, for example, such as the face of a cell phone. Alternatively, the protective cover may comprise dimensions such that it may be wrapped around one or more sides of the electronic device, or portions of one or more sides of the electronic device.

Without wishing to be limiting in any manner, the protective cover is preferably a thin protective cover comprising a maximum thickness of less than about 1 mm, more preferably less than about 0.5 mm. In an alternate embodiment, the protective cover comprises a thickness in the range of about 0.05 mm to about 0.6 mm, preferably about 0.07 mm to about 0.5 mm. In still an alternate embodiment, the protective cover comprises a vinyl surface layer with a thickness of about 0.003 inches (about 0.0762 mm). It is also contemplated that the protective cover of the present invention may comprise a plurality of different thicknesses over the surface of the cover. For example, but not wishing to be limiting, a particular section of the protective cover may comprise a plurality of laminates and thus be thicker than an adjacent section of the protective cover. The thicker sections may provide increased durability and protection to the underlying electronic device when affixed thereto.

It is also contemplated that the protective cover may comprise a material that is transparent or substantially transparent, or comprise one or more parts which are transparent or substantially transparent. In an embodiment which is not meant to be limiting in any manner, the transparent or substantially transparent portion may optionally cover a display screen or the like. As will be evident to a person of skill in the art, in such an embodiment it is preferred that the transparent portion that covers a display screen employ an adhesive that does substantially affect the visual transfer of information from the device to the user. It is also contemplated that a transparent portion of the protective cover may lack an adhesive layer. However, in such an embodiment, it is generally preferred that the region of the protective cover that surrounds the display screen be affixed to the electronic device.

All citations are herein incorporated by reference.

The present invention has been described with regard to one or more embodiments. However, it will be apparent to persons skilled in the art that a number of variations and modifications can be made without departing from the scope of the invention as defined in the claims.

What is claimed is

1. A method of customizing a cover for a surface of a mobile electronic device, the mobile electronic device having a display screen, the method to occur post manufacturing of the mobile electronic device, the method comprising:
   at a server, providing an interactive web-based customization tool to a client through a network, the interactive web-based customization tool configured to allow a user at the client to:
      display a template associated with a user selected mobile electronic device selected by the user from a plurality of different mobile electronic devices, the template corresponding to dimensions of the surface of the user selected mobile electronic device and including one or more than one section, each section defining an opening of the cover or a transparent part of the cover; and
      create an image on the template based on a user-provided photographic image, user-provided image positioning and user-provided image sizing to produce a customized cover, and
   printing or manufacturing the customized cover post manufacturing by a party other than the manufacturer of the mobile electronic device, such that the image does not cover the opening of the cover or the transparent part of the cover.

2. The method of claim 1, wherein the step of printing comprises printing the customized cover onto a flexible sheet.

3. The method of claim 2, wherein the step of printing is implemented by thermal printing, solvent printing or a combination thereof.

4. The method of claim 3, wherein the thermal printing comprises a printing process using a resin based film, a ribbon or a foil.

5. The method of claim 3, wherein the solvent printing comprises a vinyl printing process utilizing liquid ink.

6. The method of claim 2, wherein the step of printing further comprises applying one or more than one laminate on the flexible sheet having been printed.

7. The method of claim 1, wherein the step of printing comprises sending the customized cover to a printer at the client without uploading the customized cover to the server.

8. The method of claim 1, wherein the step of printing comprises uploading the customized cover to the server for printing.

9. The method of claim 2, further comprising cutting the flexible sheet having been printed based on the template used for the customized cover.

10. The method of claim 9, wherein the step of cutting comprises removing from the flexible sheet one or more than one portion associated with the opening.

11. The method of claim 9, wherein the step of cutting comprises cutting the flexible sheet by at least one of punching, die-cutting, contour cutting, or liner cutting.

12. The method of claim 1, wherein the image created on the template further includes a background image, a text image, or a combination thereof.

13. The method of claim 1, wherein the interactive web-based customization tool is configured to allow the user at the client to create the image on the template by performing at least one of manipulating, editing or modifying the user-provided photographic image.

14. The method of claim 1, wherein the interactive web-based customization tool is configured to provide the client with a preview web page once the customization is completed.

15. The method of claim 1, wherein the interactive web-based customization tool is configured to allow the user do at least one of:
   select an image from a library provided by the server to be included in the image on the template; and
   select an image from a hard drive of the client to be included in the image on the template.

16. The method of claim 1, wherein the interactive web-based customization tool is configured to allow the user do at least one of:
   crop the image on the template;
   rotate the image on the template;
   resize the image on the template;
   slide the image on the template;
   drag the image on the template;
   implement image coloring, image blurring, contrast changing, brightness changing or combinations thereof to the image on the template; and
   remove, replace, add or form a visible object in the image on the template.

17. The method of claim 2, wherein the flexible sheet is made of vinyl, plastic, silicon, rubber, acrylic or combinations thereof.

18. The method of claim 2, wherein the flexible sheet further comprises a pressure sensitive adhesive layer.

19. The method of claim 18, further comprising wrapping the flexible sheet having been printed around one or more portions of the mobile electronic device.

20. The method of claim 1, further comprising applying the cover to at least a part of a side or a part of the surface of the mobile electronic device.

21. The method of claim 1, further comprising, saving the customized cover at the server.

22. The method of claim 1, wherein the interactive web-based customization tool is configured to allow the user at the client to:

select the user selected mobile electronic device among the plurality of different mobile electronic devices; and select one or more than one surface of the user selected mobile electronic device, such that the template associated with the one or more than one surface is provided for display.

23. The method of claim 9, wherein the template includes a trace line that is utilized by the creating step, the printing step, the cutting step, or combinations thereof.

24. The method of claim 1, further comprising implementing management of an order from the client, management of a client profile, or a coupon management.

25. The method of claim 1, wherein the interactive web-based customization tool is configured to allow the user at the client to select the user selected mobile electronic device among the plurality of different mobile electronic devices.

26. The method of claim 1, wherein the image on the template further comprises one or more images comprising one or more company brands, slogans, patterns, designs, graphics, photographs, logos, advertisements, or combinations thereof.

27. The method of claim 1 further comprising
at a server, receiving a user selection of the user selected mobile electronic device prior to providing the interactive web-based customization tool to the client.

28. The method of claim 1, wherein the interactive web-based customization tool is configured to allow the user at the client to select the surface of the mobile electronic device.

29. The method of claim 1, wherein the interactive web-based customization tool is configured to allow the user at the client to select each of multiple surfaces of the mobile electronic device, and create the image on the template for each of the multiple surfaces.

30. The method of claim 1 wherein the surface of the mobile electronic device includes the display screen.

31. The method of claim 1 wherein the surface of the mobile electronic device does not include the display screen.

32. The method of claim 1 wherein one of the one or more than one section of the template defines a given opening in the cover, the given opening corresponding to the display screen.

33. The method of claim 1 wherein the one or more than one section of the template define one or more openings in the cover, the one or more openings corresponding to one or more of a control, a dial, a button, an antenna, an input jack, an output jack, a display, a microphone, a speaker, a signal port, a hardware connector port, a software connector port, battery control, and a keypad of the mobile electronic device.

34. The method of claim 1 wherein the one or more than one section of the template define one or more openings in the cover, the one or more openings corresponding to a functional component of the mobile electronic device not to be covered by the cover.

35. The method of claim 1, wherein the interactive web-based customization tool is configured to allow the user at the client to create the image on the template based on the user-provided photographic image and one or more additional images, the user-provided image positioning and the user-provided image sizing to produce the customized cover.

36. The method of claim 35 wherein the one or more additional images comprise one or more of text, company brands, slogans, patterns, designs, graphics, photographs, logos, advertisements, or combinations thereof.

* * * * *